(12) United States Patent
McCormick et al.

(10) Patent No.: US 7,442,873 B2
(45) Date of Patent: Oct. 28, 2008

(54) ENVIRONMENTALLY PROTECTED ENCLOSURE FOR ELECTRICAL POWER DISTRIBUTOR AND THE LIKE

(76) Inventors: Sean McCormick, 167 Cedar La., Ossining, NY (US) 10562; Peter Herrmann, 86 Woodcrest Ave., White Plains, NY (US) 10604; William Froehlich, 427 N. Lake Blvd., Mahopac, NY (US) 10541

( * ) Notice: Subject to any disclaimer, the term of this patent is extended or adjusted under 35 U.S.C. 154(b) by 196 days.

(21) Appl. No.: 11/347,023

(22) Filed: Feb. 3, 2006

(65) Prior Publication Data

US 2007/0210087 A1    Sep. 13, 2007

(51) Int. Cl.
    *H02G 3/08* (2006.01)
(52) U.S. Cl. .............. 174/50; 174/57; 174/58; 174/60; 220/4.02; 248/906; 52/220.1
(58) Field of Classification Search ............. 174/50, 174/57, 58, 59, 60, 17 R, 135; 220/4.02, 220/3.9, 3.2, 3.6; 439/142, 435; 248/906; 52/220.1
See application file for complete search history.

(56) References Cited

U.S. PATENT DOCUMENTS

| 7,045,730 | B2 * | 5/2006 | Hollar et al. ............. 200/293 |
| 7,064,269 | B2 * | 6/2006 | Smith ..................... 174/50 |
| 7,105,742 | B1 * | 9/2006 | Jolly ...................... 174/50 |
| 7,105,744 | B1 * | 9/2006 | Kwong et al. ............. 174/58 |
| 7,135,640 | B1 * | 11/2006 | Ofcharsky et al. ......... 174/58 |
| 7,148,420 | B1 * | 12/2006 | Johnson et al. ........... 174/58 |
| 7,186,912 | B2 * | 3/2007 | Guan et al. ............... 174/50 |
| 7,186,913 | B2 * | 3/2007 | Hull et al. ............... 174/50 |
| 7,271,351 | B2 * | 9/2007 | Drane .................... 174/483 |
| 7,279,633 | B2 * | 10/2007 | Waters ................... 174/50 |

* cited by examiner

*Primary Examiner*—Dhiru R Patel
(74) *Attorney, Agent, or Firm*—Thomas A. O'Rourke; Bodner & O'Rourke, LLP

(57) ABSTRACT

An improved enclosure for electrical components is provided. The enclosure protects components from the environment. The enclosure may rest on a surface and to move it from one location to another the enclosure may be rotated 90° and can travel on top and bottom side wall portions. There is a recessed portion between the top and bottom side wall portion where electrical connections may be present and do not interfere with movement of the enclosure.

17 Claims, 26 Drawing Sheets

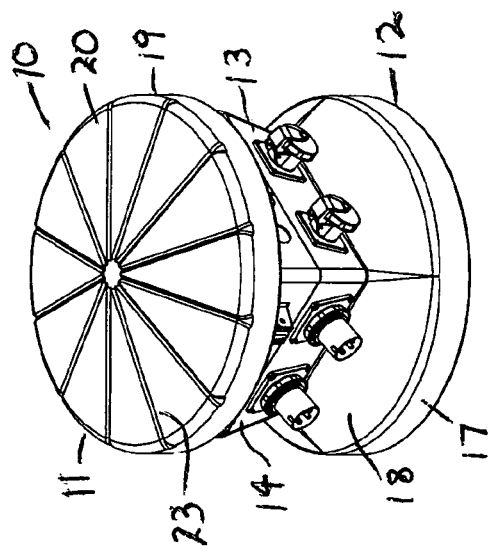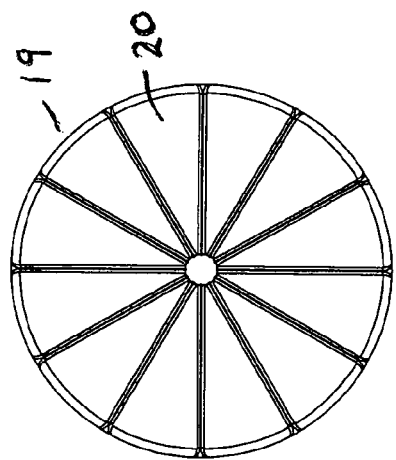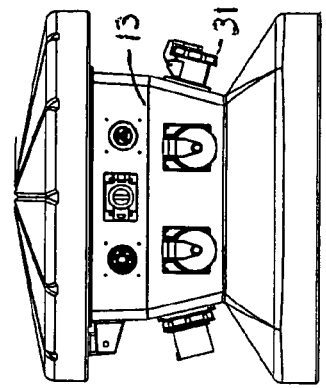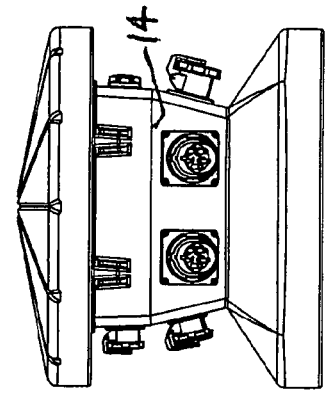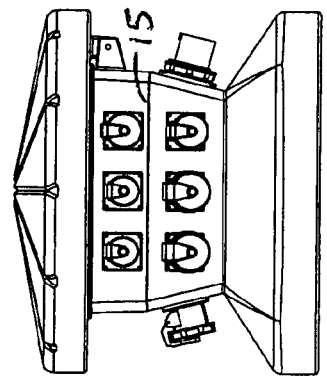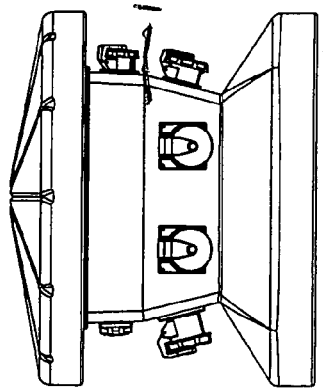

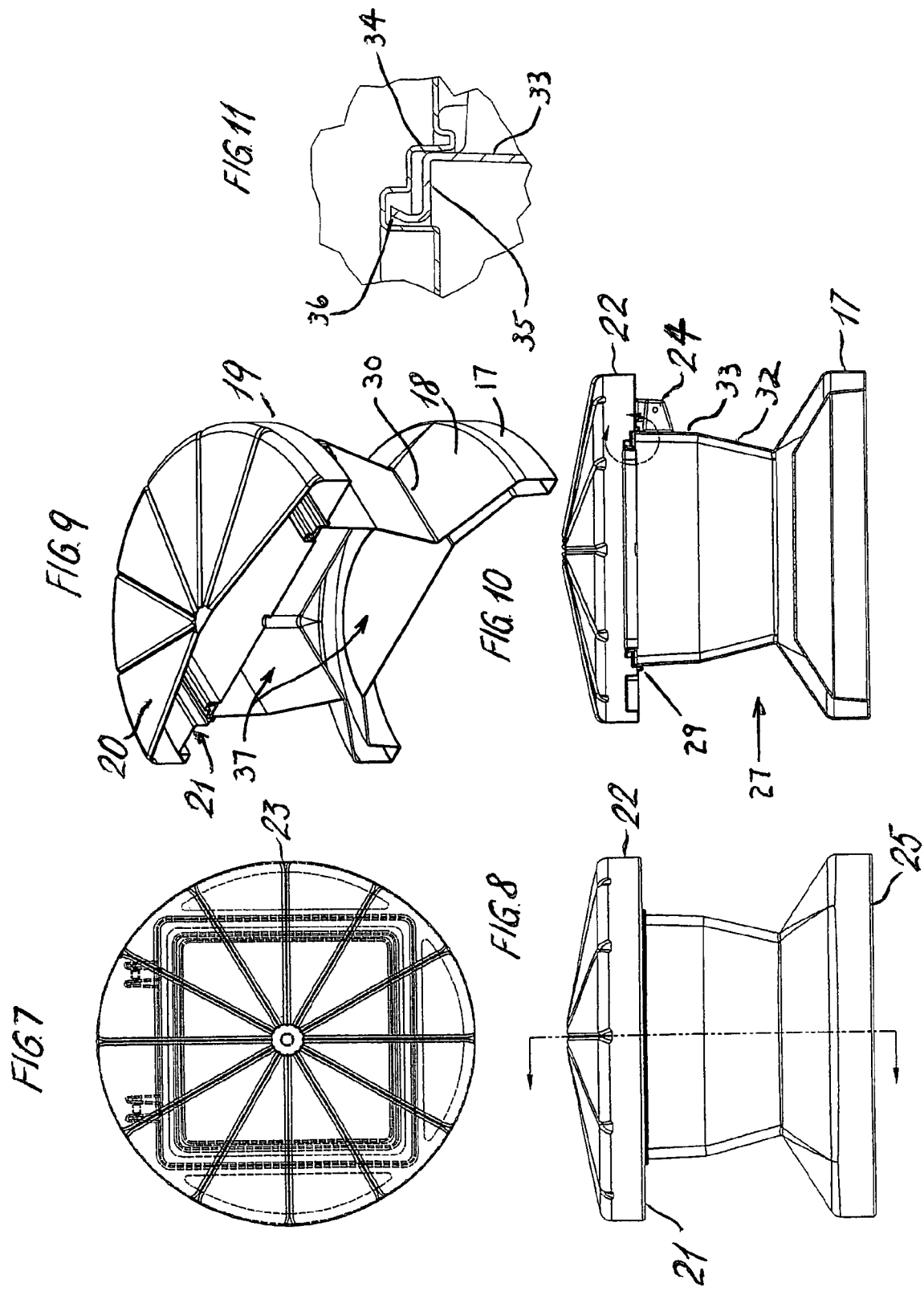

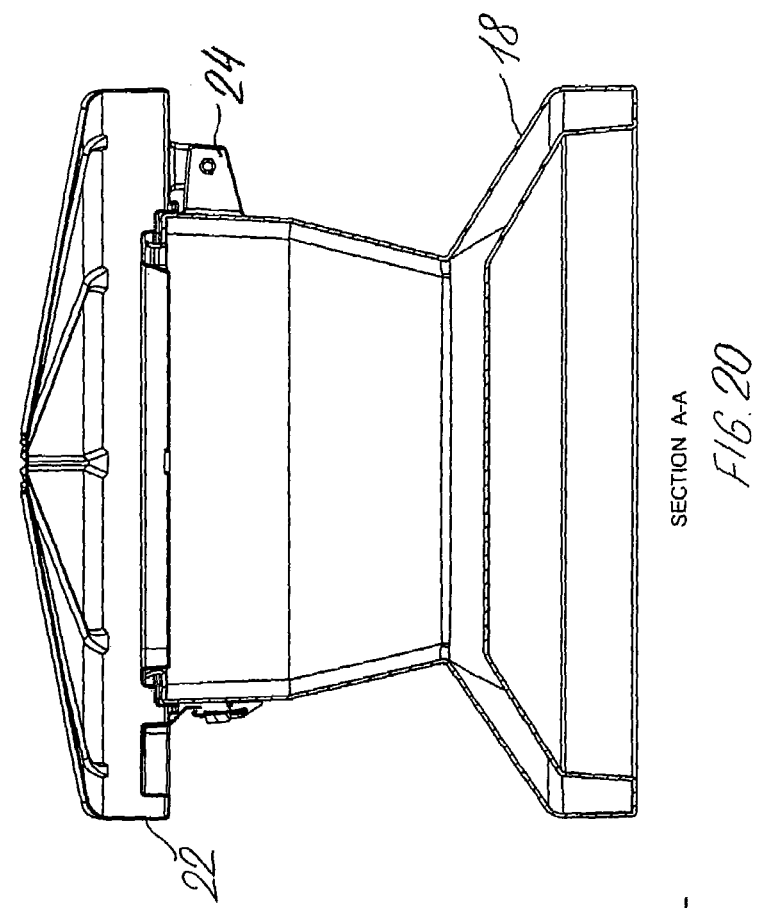
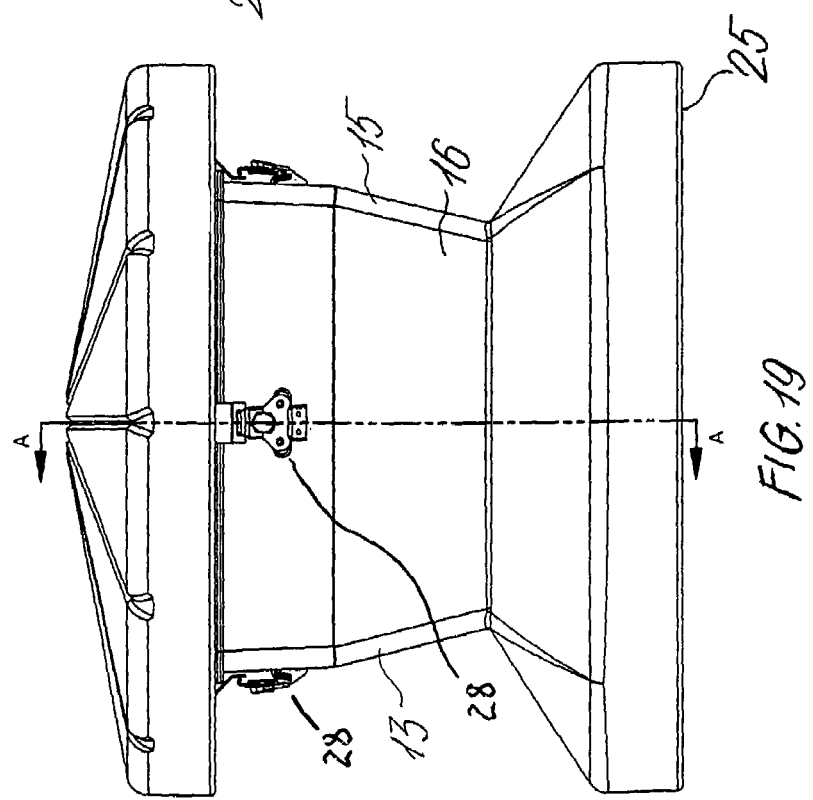

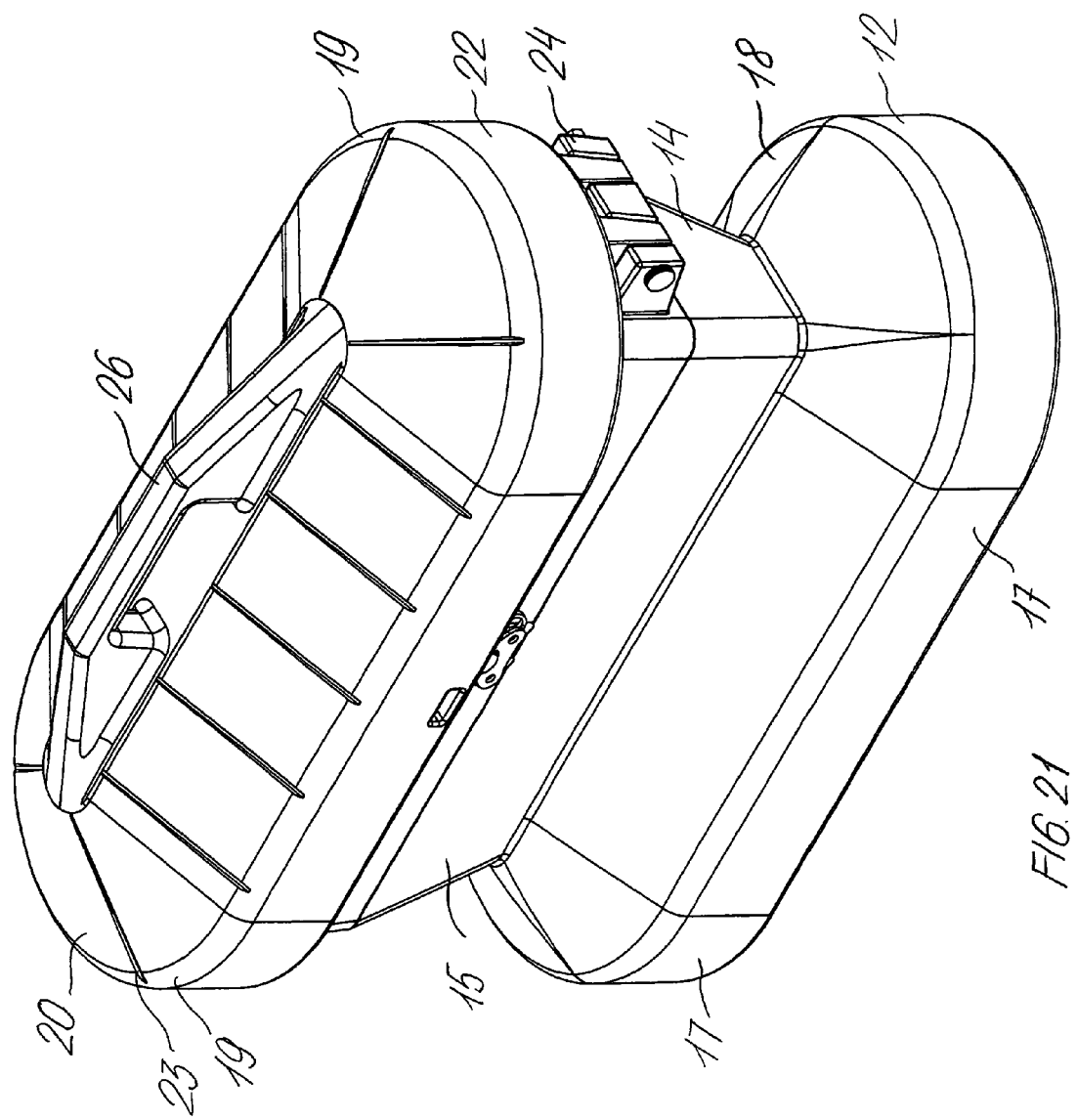

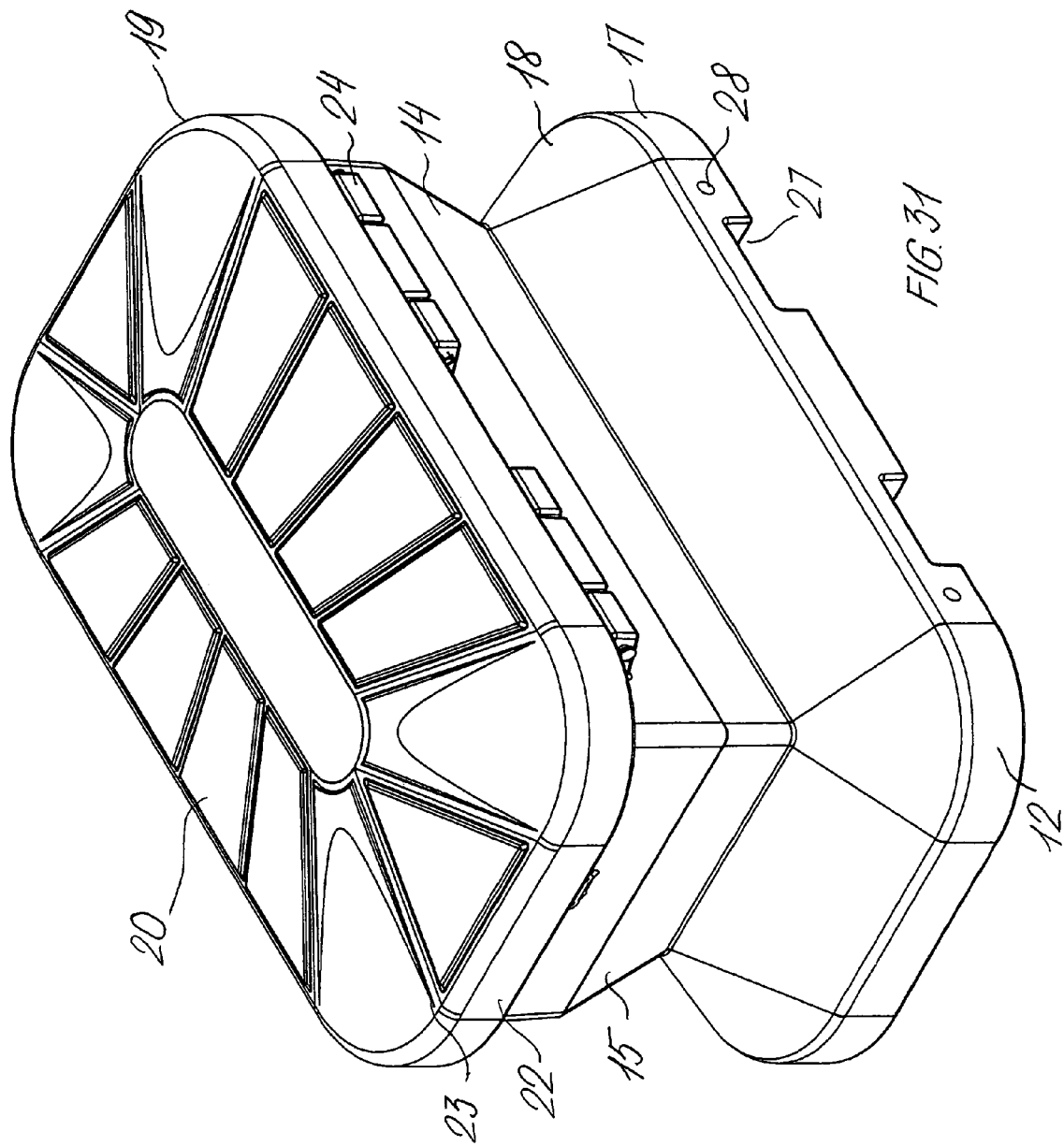

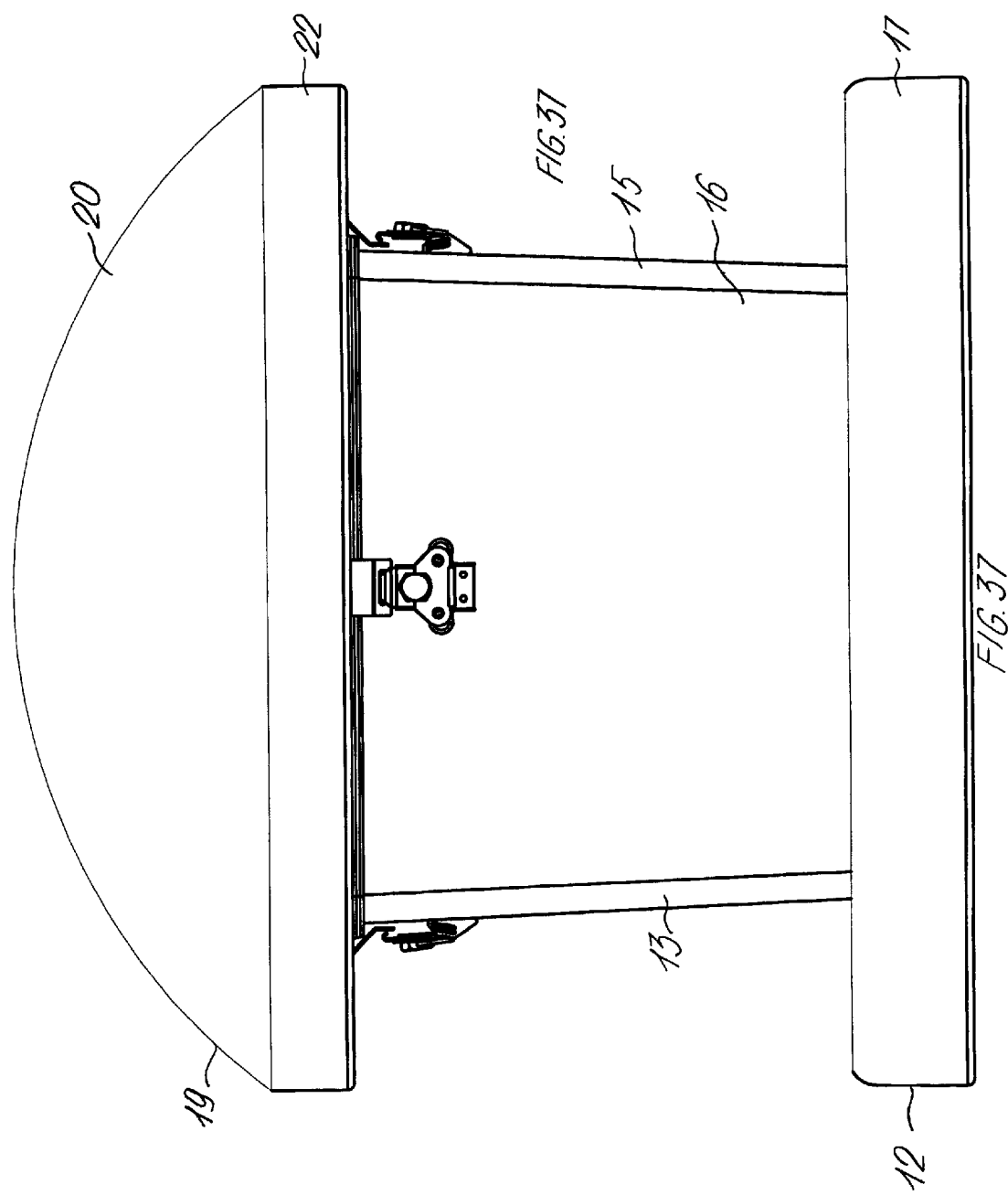

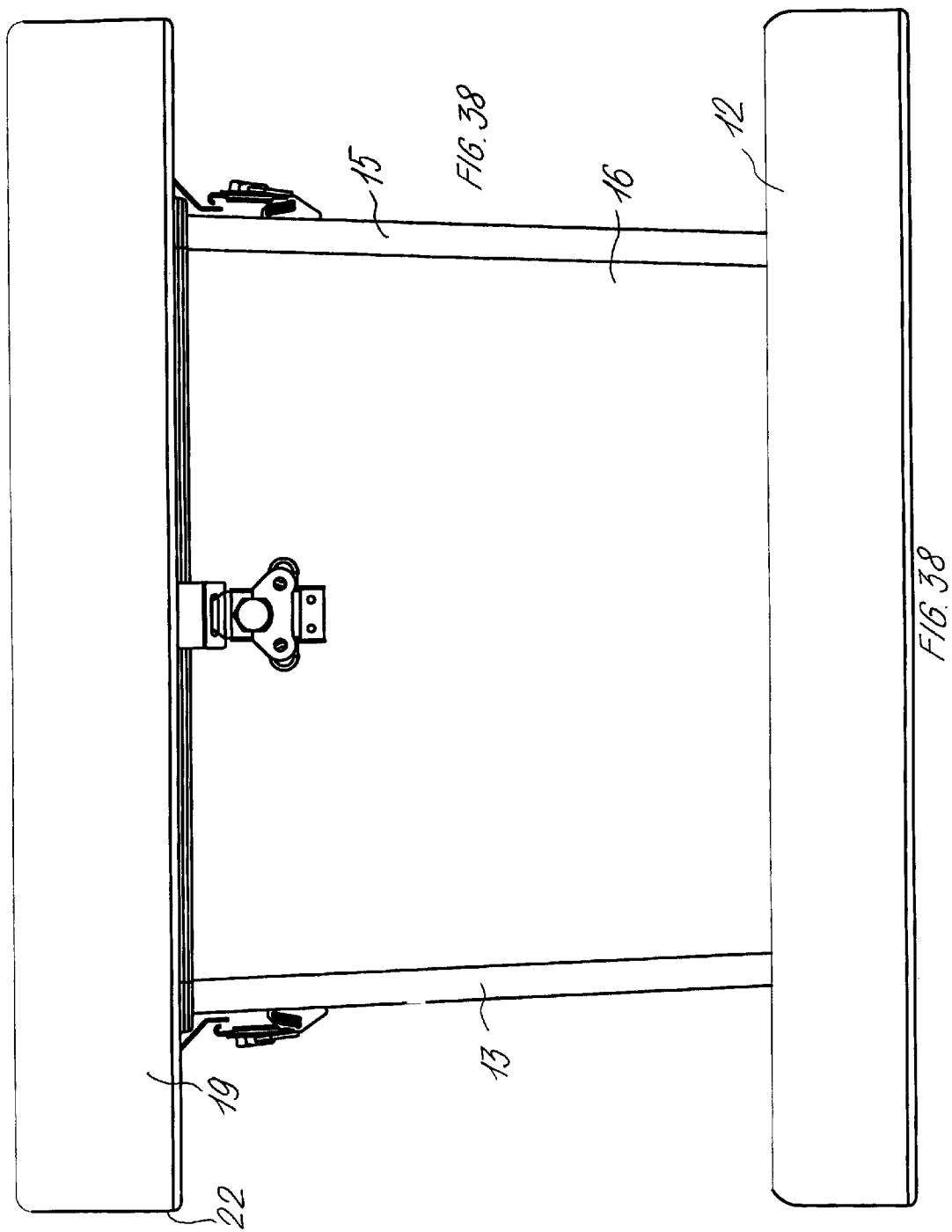

US 7,442,873 B2

ENVIRONMENTALLY PROTECTED ENCLOSURE FOR ELECTRICAL POWER DISTRIBUTOR AND THE LIKE

FIELD OF THE INVENTION

The present invention is applicable to enclosures that protect components usually electrical components and other sensitive devices contained therein. These components are to be protected from environment hazards such as moisture, debris, dirt, dust, etc. The components contained therein can include any of a wide variety of electrical equipment or other devices that may be used outdoors or indoors. The enclosures can have features that assist in the transportability of the enclosures under a wide range of conditions. This invention has a particular applicability to use with portable power distribution systems and provides these systems with protection from the environment and an ability to be transported including by rolling over the ground. The device of the present invention also protects components against corrosion, wind and rain, and is undamaged by the formation of ice on the enclosure.

BACKGROUND OF THE INVENTION

Environmentally protected enclosures have a variety of uses at a job site, work stations and/or out in the field. One application for enclosures is as protection for power equipment at a remote site. Portable power distribution boxes allow connecting several different types of corded plugs at a central convenient location away from a power source. Such devices are widely used in construction sites, farms, convention centers, outdoors festivals, trade shows, by emergency response teams, etc. Typical portable power distribution boxes usually include one or more input modules and one or more, usually several, output modules. A majority of such prior art boxes have a shape of a rectangle or a cube usually with handles attached and have rugged heavy duty steel construction and/ or are made from a hard rubber based material. The prior art devices have a structure and composition that significantly increases bulkiness and weight of the power distribution boxes. Because of its awkwardness it is likely that it would require at least two persons to carry a distribution box around when such box is needed to be transported or moved at a site even for short distances due to its weight and size. Many of the prior art enclosures besides being bulky and heavy are susceptible to infiltration intrusion of sand, dirt, water, etc. As a result, there is a need for an improved enclosure that avoids the problems of the prior art and provides a protective enclosure.

OBJECTS OF THE INVENTION

It is an object of the invention to provide an improved environmentally protected enclosure for electrical components and the like.

It is another object of the invention to provide an improved enclosure that may be transported comparatively easily from one location to another compared to prior devices.

It is a further object of the invention to provide an enclosure that will provide multiple sources of power from a single input.

It is also an object of the invention to provide an improved receptacle for a power distribution system.

It is a still further object of the invention to provide an enclosure that is lightweight and made from a durable material.

It is still another object of the invention to provide an enclosure that will pass National Electrical Manufacturers Association (NEMA) standards for outdoor electrical equipment.

It is also an object of the invention to provide an enclosure that will protect electrical and other components from corrosion, dust, rain, splashing water, ice, heat, etc.

Other objects will be readily apparent to those skilled in the art.

SUMMARY OF THE INVENTION

The improved enclosure of the present invention provides an environmentally protected enclosure for a variety of applications. These applications include but are not limited to use as a receptacle for a power distribution system. In one embodiment, the enclosure of the present invention permits a user to transport the enclosure by rolling the enclosure along a surface such as the ground, platform, floor, etc. and to relocate it from one position to another. The enclosure of the present invention protects electrical components, audio components and the like and any other devices contained in the enclosure from the environment. The enclosure of the present invention is preferably made from one or more polyethylene-based thermoplastics making it lightweight and increasing its durability.

The invention is also designed to pass National Electrical Manufactures Association (NEMA) standards for outdoor electrical equipment. NEMA has established a range of standards for electrical apparatus enclosures. One such NEMA' standard—a standard of type 4x enclosures—are intended for indoor or outdoor use primarily to provide a degree of protection against corrosion, windblown dust and rain, splashing water and hose-directed water, and to be undamaged by the formation of ice on the enclosure. However the standards are not intended to provide protection against such conditions as internal condensation or internal icing. The articles of the current invention can be manufactured in compliance with NEMA, more particularly NEMA 250, and can satisfy all requirements of type 4x enclosures as defined by NEMA.

The present invention is directed to an improved environmentally protected enclosure. The present invention may be used as an enclosure for portable power distribution systems or other suitable electrical systems, audio equipment and/or power generators and the like. The enclosure of the present invention in its broadest fashion typically has a base for resting on a surface. The surface can be any typical surface, the ground, a platform, etc. The base is usually relatively flat but it need not be and can have one or more indentations, recesses or protrusions to facilitate the positioning of the enclosure of the present invention on an irregular surface. Extending upwardly from the base are one or more side walls enclosing a cavity formed by the enclosure with an opening for positioning one or more devices such as electrical components.

In a preferred embodiment, the side wall has a plurality of sections as it extends upwardly. There may be a first side wall portion that extends from the edge of the base generally perpendicular thereto. At the end of the base side wall portion opposite the base there may be one or more additional side wall portions extending inwardly from the base side wall. These additional side wall portions are preferably inward of the base sidewall portion to permit one or more receptacles to be provided on the outer surface of these side wall portions in a manner that they do not extend past the base side wall portion. These additional side wall portions may each be straight, curved or a combination thereof.

Over the opening formed by the sidewalls there is a lid or cover. This lid or cover has a top surface and a bottom surface. Extending downwardly from the top surface is a top side wall portion. The top side wall portion and the base side wall portion provides a surface for transporting the device of the present invention.

The article of the present invention may be positioned on a surface. When it has to be moved, the device flipped onto its side i.e. is moved generally about 90° so that the base and the top surface are generally about 90° to the ground or other surface. The top side wall portion and the base side wall portion provide a surface for rolling the article of the present invention to a second location. The base and cover are preferably formed from a thermoplastic material such as a polyethylene based thermoplastic. One preferred thermoplastic is high density polyethylene. One skilled in the art can use a variety of other thermoplastic materials. It is preferred that the base and the side walls be formed as a unitary piece to reduce the possibility of ingress of water, sand and other deleterious materials through joints where the side walls and base are connected. One or more of the side walls of the device have orifices therein where electrical or other receptacles may be secured so that the device may be used to extend the reach of power lines in an outdoor setting such as out in the field or at a military base or camp.

The cavity provides an area where electrical or other environmentally sensitive equipment may repose. In one embodiment, a flexible film such as a silicone based film may extend across the top edge of the side walls or from one interior side wall of the enclosure to the other forming a protective covering or seal over any components contained therein. Where throw switches and the like including circuit breakers and other switches are present, the on/off throw of these switches may be positioned in proximity or in contact with the protective film. If the film is of a sufficient thickness and flexibility, a user of the device can operate the throw without removing the film thereby presenting an enclosure base portion that is environmentally sealed and protected from water, dirt, sand, etc. The presence of the cover further protects the components in the enclosure.

The enclosure base is also provided with a removable cover that may be secured to the base for use and transporting. To also assist in transporting the enclosure of the present invention, the base may be provided with two slots or inverted, generally u-shaped, cut outs or indentations along the underside of the base for receiving the forks of a fork lift. Other features include molded handles for manual transportation. Another feature of the invention is that it may be rolled along the ground to simplify its relocation from place to place. This would require minimum effort to carry the device around even over muddy or rough terrain if such necessity exists where the base and top side wall portions are sufficiently wide. In order to be rolled, the invention may have a shape of a cylinder or similar geometric figure. For example, the enclosure may have a generally round or ovoid shape or a shape with four sides that are relatively straight with curved corners to facilitate rolling. At the same time, a power distribution device may be provided with at least one relatively flat surface on the base or with some other means to position the device in a relatively level or a safe manner to prevent easily tipping of the device.

When the enclosure is used for power distribution, the enclosure may have several input and output modules that allow for plugging electric power-consuming devices and/or power output devices. Such modules may be positioned around the side and upper surface of the power distributor in order to provide equal access to any module. In a preferred embodiment, the cross section of the base portion is larger than the cross sectional area of the portion of the enclosure where the modules are located. The cover or upper portion of the side walls also has a larger cross sectional area so that the resulting structure can preferably have a generally "hour glass" shape. When the enclosure is transported, for example, by rolling, the modules do not come into contact with the surface on which the device is moved. It is preferred that the cover cross section and the base cross section have generally similar dimensions or "diameters" serving like wheels to allow the enclosure to maintain relatively straight direction when it is rolled. The present invention provides an enclosure that protects the contents from the environment yet is strong, resistant to breaking and which can be easily transported.

BRIEF DESCRIPTION OF THE DRAWINGS

FIG. 1 is a prospective view of the enclosure for electrical power distributor.

FIG. 2 is a top view of the enclosure for electrical power distributor of FIG. 1.

FIG. 3 is a side view of the enclosure for electrical power distributor of FIG. 1 taken from the direction opposite to the direction C shown in FIG. 1.

FIG. 4 is a side view of the enclosure for electrical power distributor of FIG. 1 taken from the direction opposite to the direction D shown in FIG. 1.

FIG. 5 is a side view of the enclosure for electrical power distributor of FIG. 1 taken from the direction C.

FIG. 6 is a side view of the enclosure for electrical power distributor of FIG. 1 taken from the direction D.

FIG. 7 is a top schematic view of the enclosure for electrical power distributor of FIG. 1.

FIG. 8 is a side view of the enclosure for electrical power distributor of FIG. 1 taken from the direction opposite to the direction C shown in FIG. 1

FIG. 9 is a cross-away view of the enclosure for electrical power distributor of FIG. 1 taken along line A-A shown in FIG. 8.

FIG. 10 is a cross-away view of the enclosure for electrical power distributor of FIG. 8 taken along Line A-A as shown in FIG. 8, with segment B.

FIG. 11 is a detailed view of the segment B of FIG. 10.

FIG. 19 is an alternative side view of the enclosure for electrical power distributor of FIG. 12.

FIG. 20 is a cross-away view of the enclosure for electrical power distributor of FIG. 12 taken along line A-A shown in FIG. 19.

FIG. 21 is a prospective view of the alternative embodiment of the enclosure for electrical power distributor of FIG. 1.

FIG. 31 is a prospective view of the alternative embodiment of the enclosure for electrical power distributor of FIG. 1.

FIG. 37 is a side view of the alternative embodiment of the enclosure for electrical power distributor of FIG. 1.

FIG. 38 is a side view of the alternative embodiment of the enclosure for electrical power distributor of FIG. 1.

DETAILED DESCRIPTION OF THE INVENTION

Figure 12:
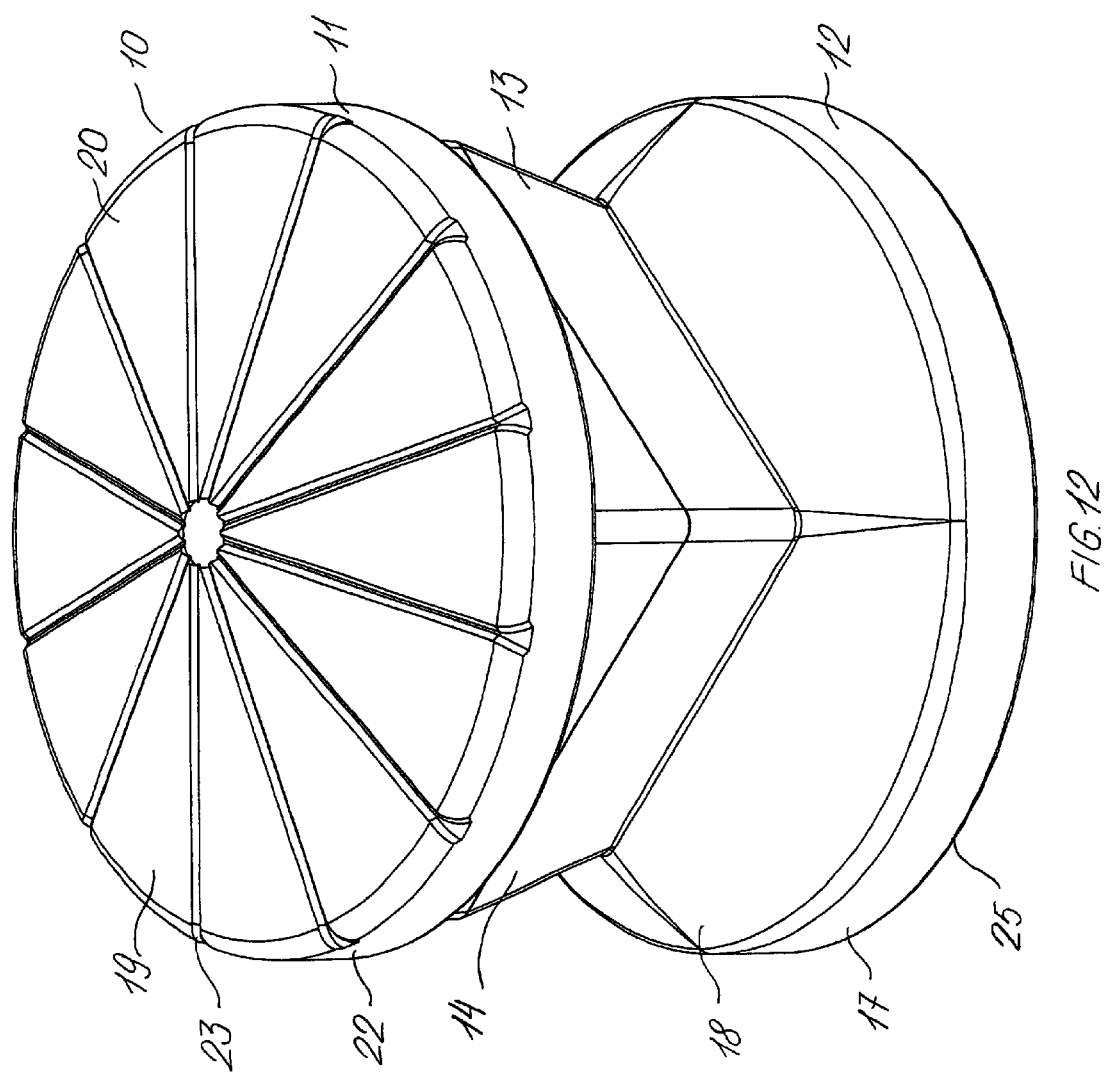
FIG. 12 is an alternative prospective view of the enclosure for electrical power distributor of FIG. 1.
Figure 13:
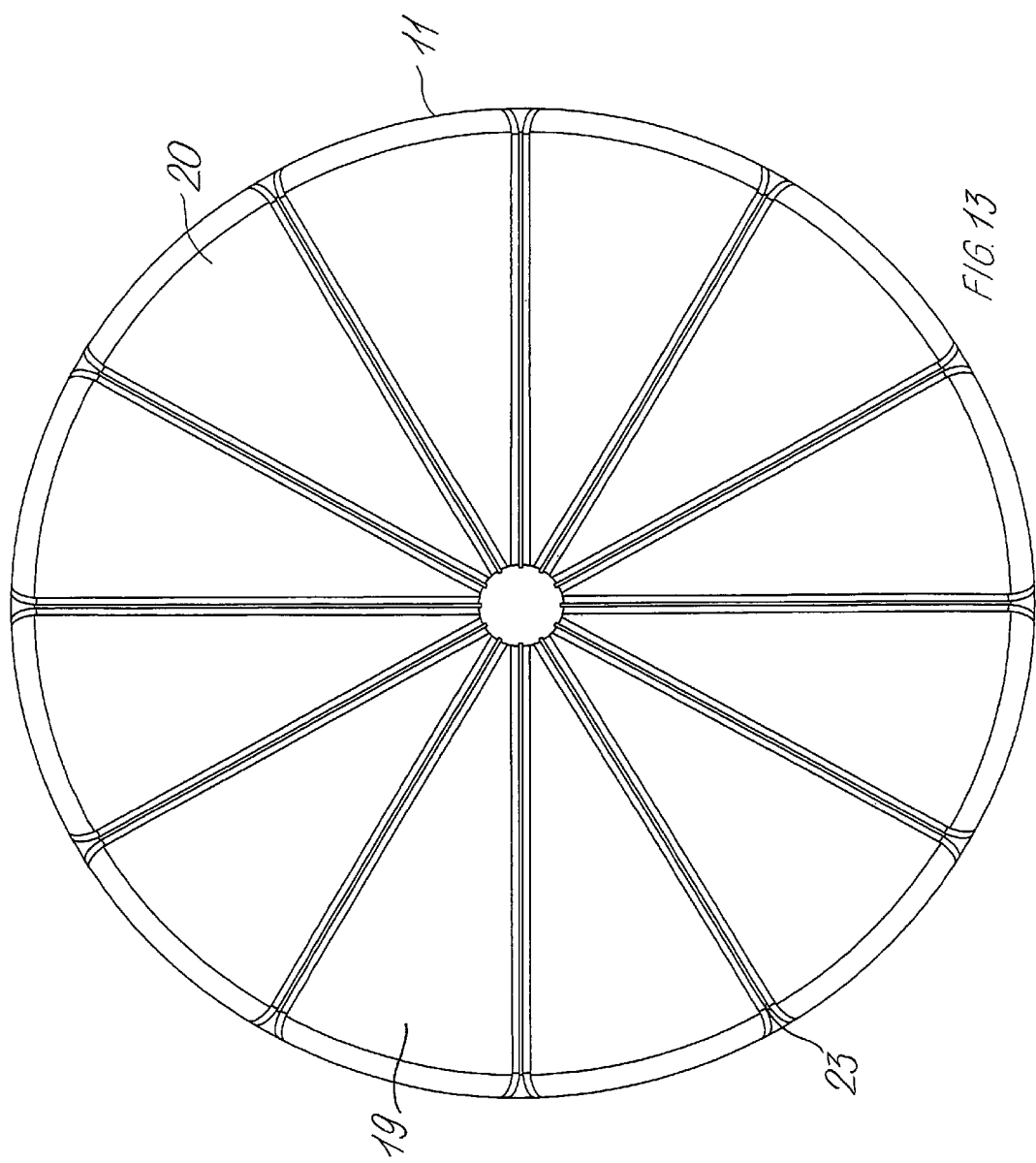
FIG. 13 is an alternative top view of the enclosure for electrical power distributor of FIG. 12.
Figure 14:
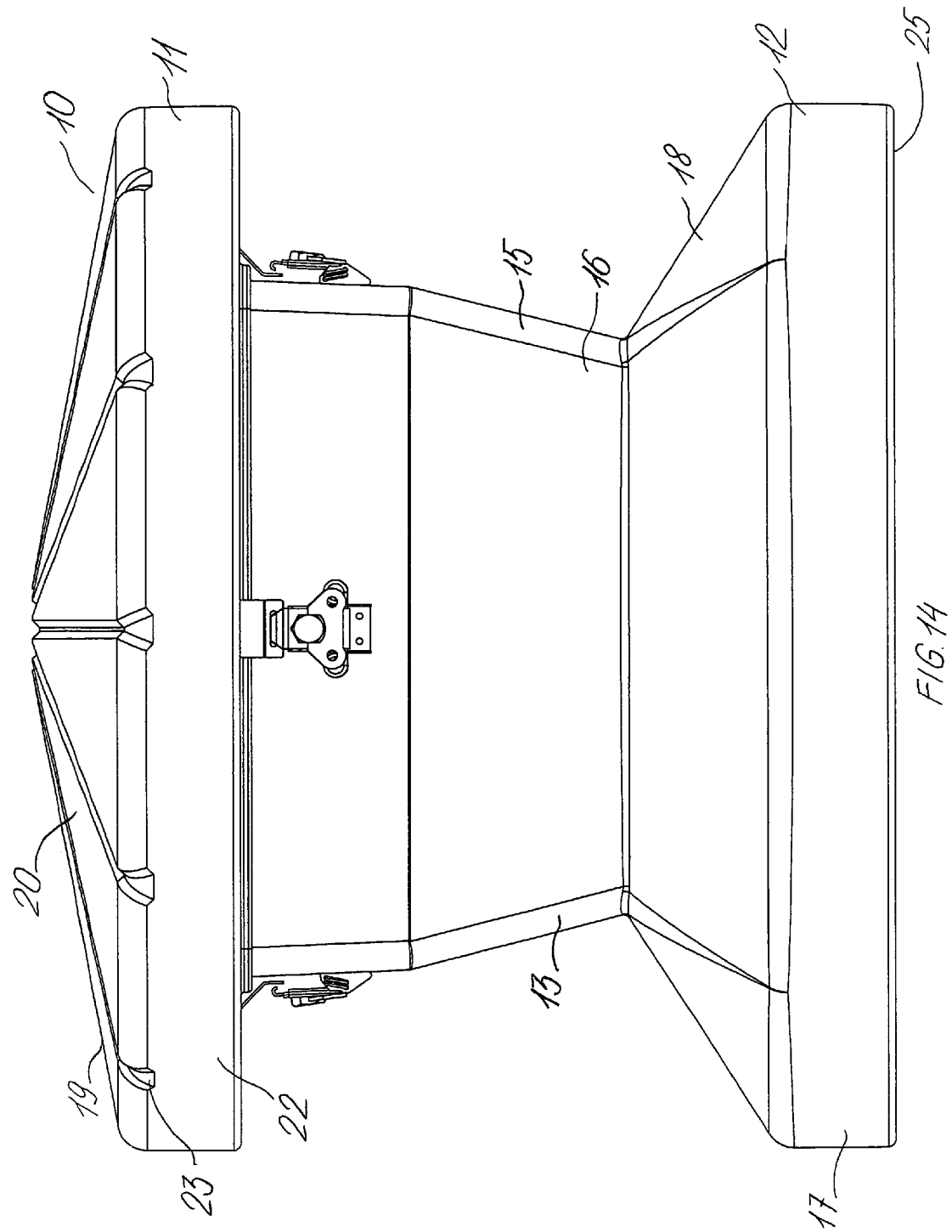
FIG. 14 is an alternative side view of the enclosure for electrical power distributor of FIG. 12.
Figure 15:
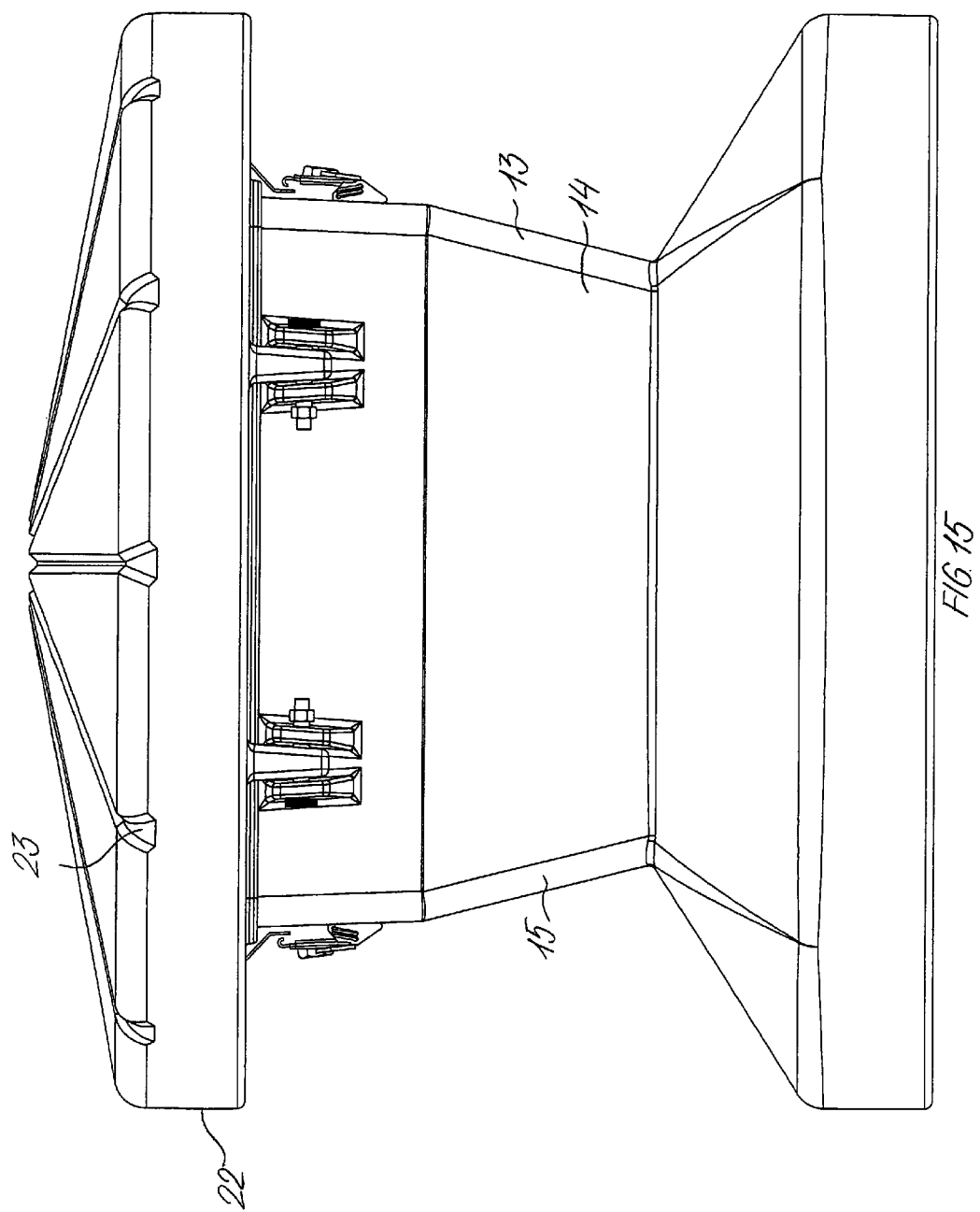
FIG. 15 is an alternative side view of the enclosure for electrical power distributor of FIG. 12.
Figure 16:
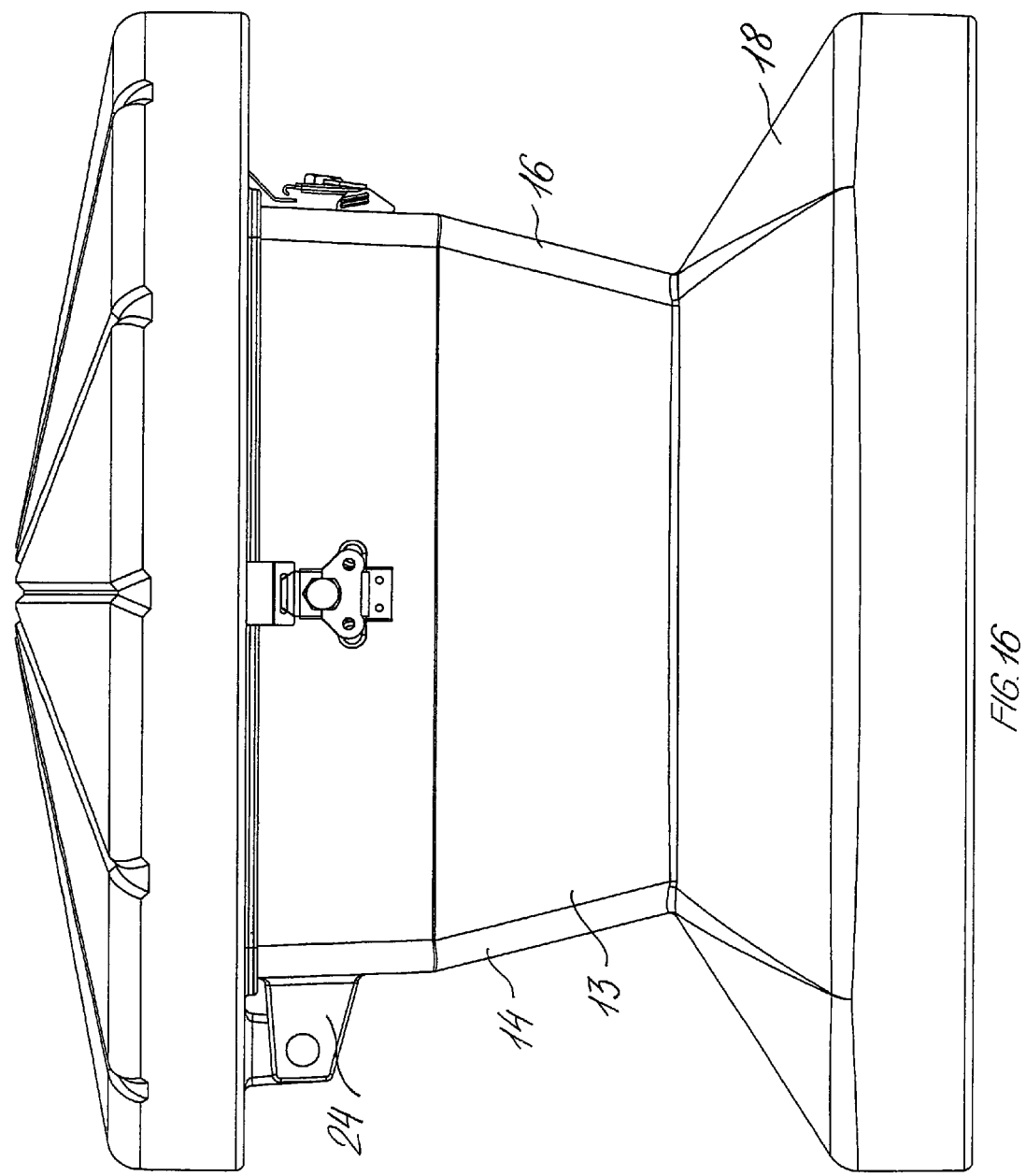
FIG. 16 is an alternative side view of the enclosure for electrical power distributor of FIG. 12.
Figure 17:
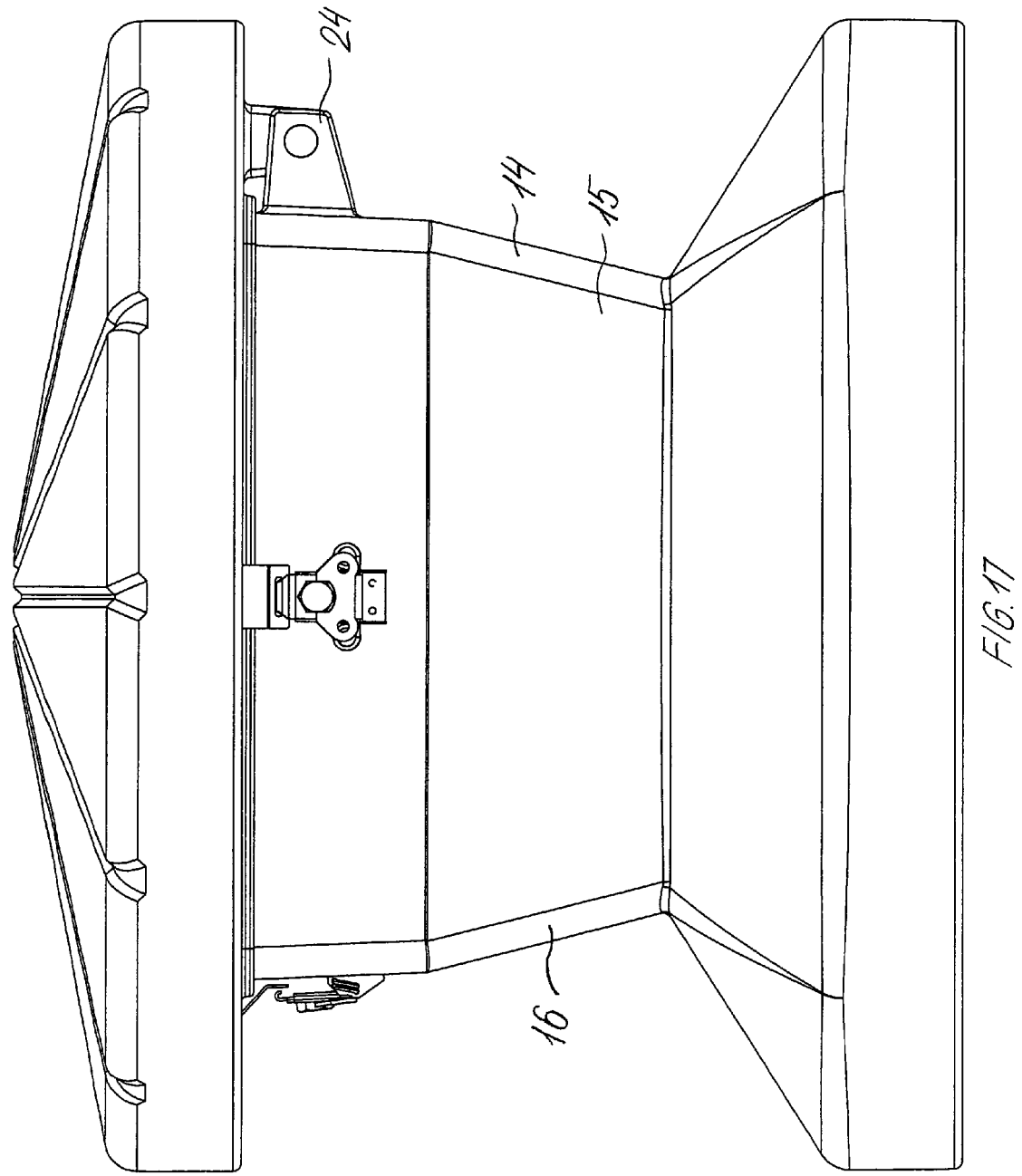
FIG. 17 is an alternative side view of the enclosure for electrical power distributor of FIG. 12.
Figure 18:
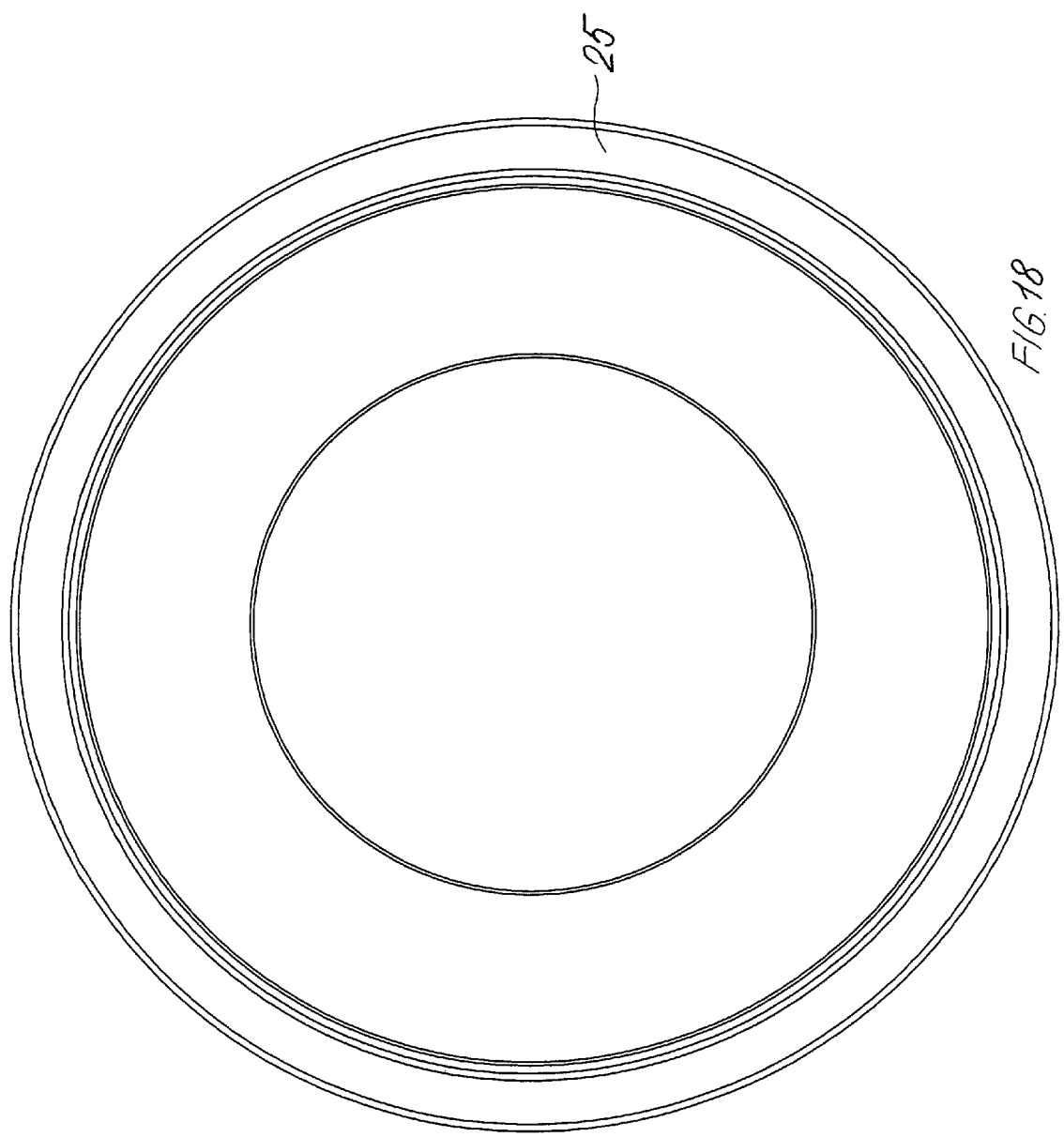
FIG. 18 is a bottom view of the enclosure for electrical power distributor of FIG. 12.
Figure 22:
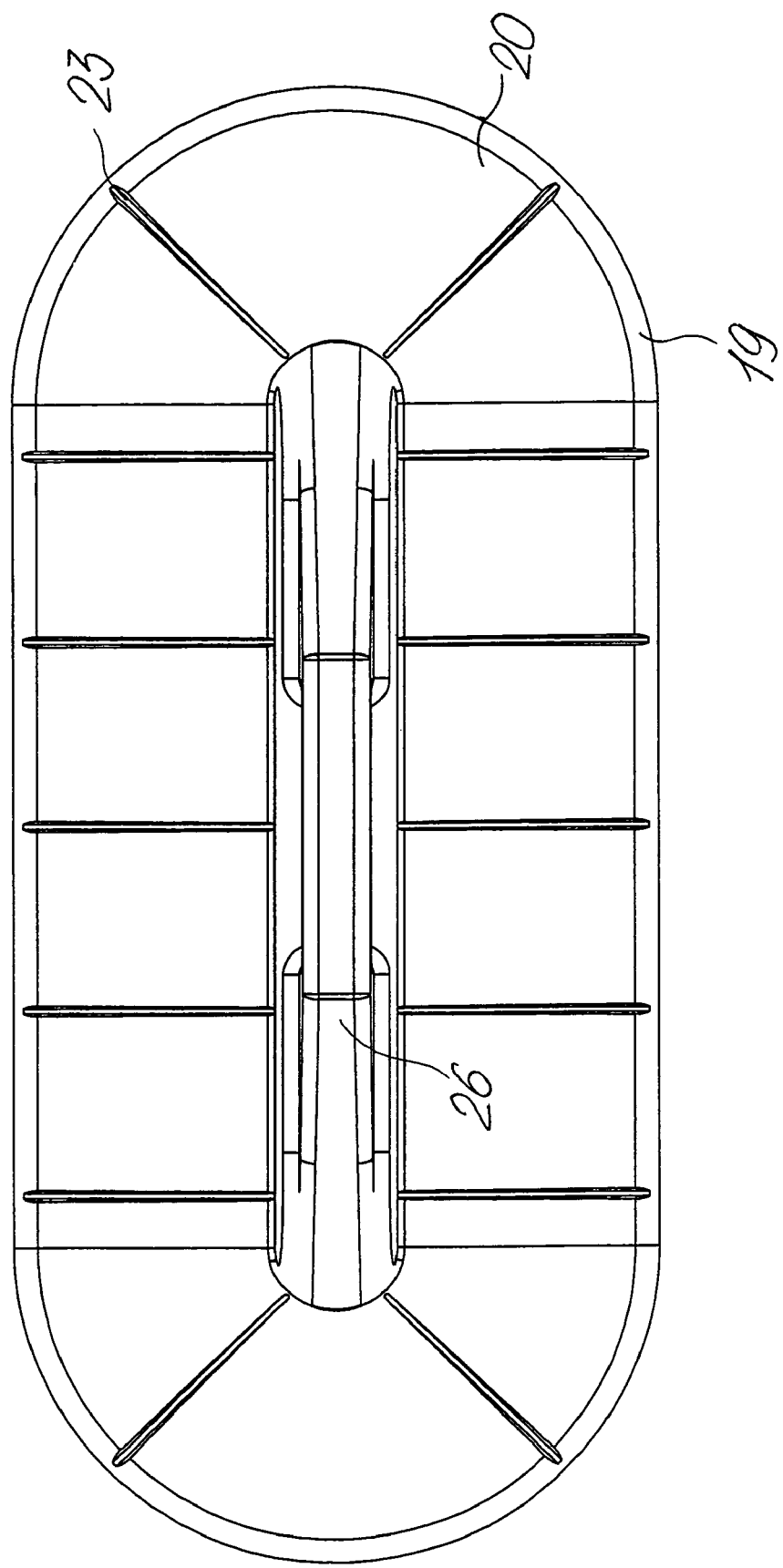
FIG. 22 is a top view of the enclosure for electrical power distributor of FIG. 21.
Figure 23:
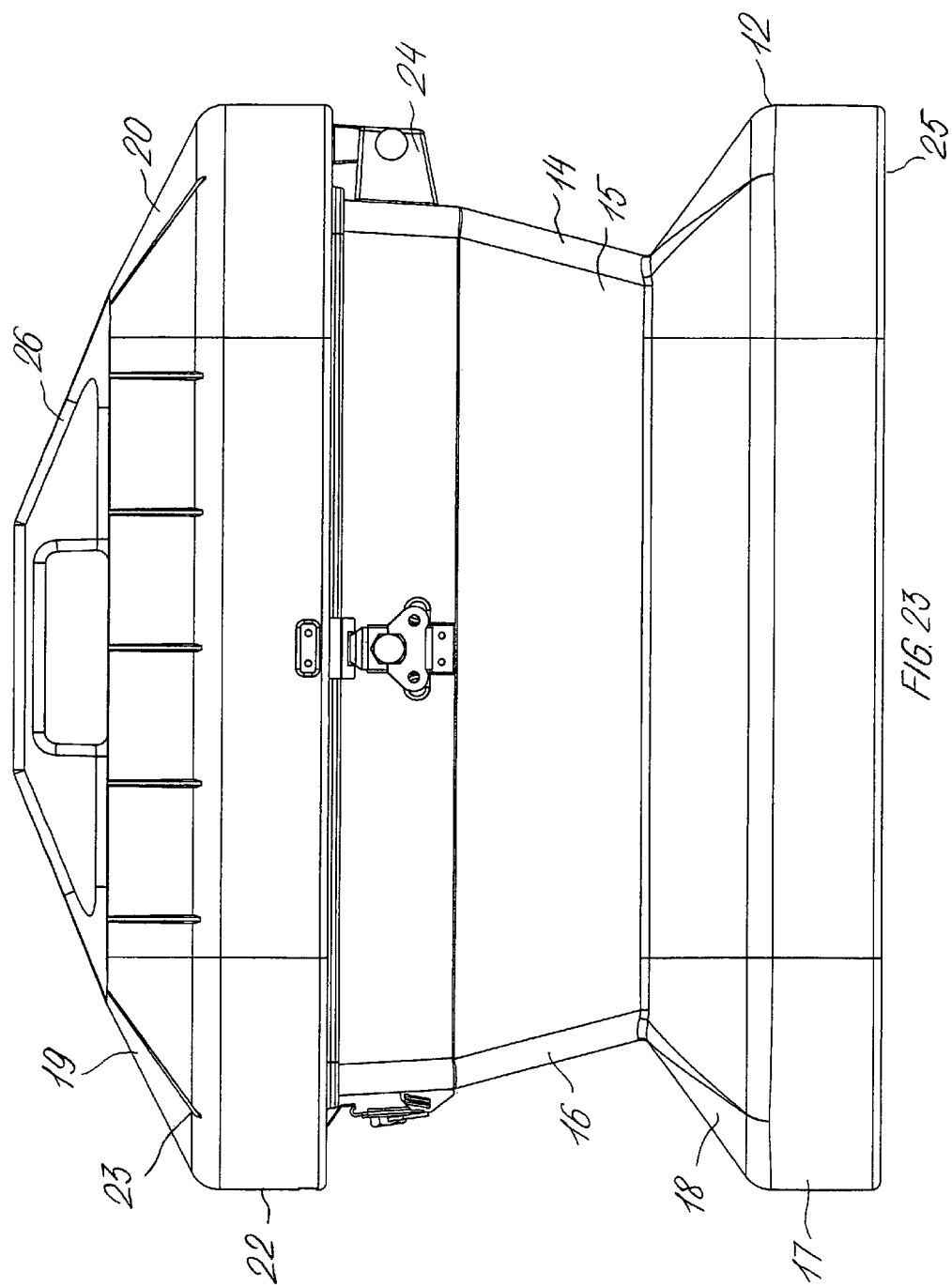
FIG. 23 is a side view of the enclosure for electrical power distributor of FIG. 21.
Figure 24:
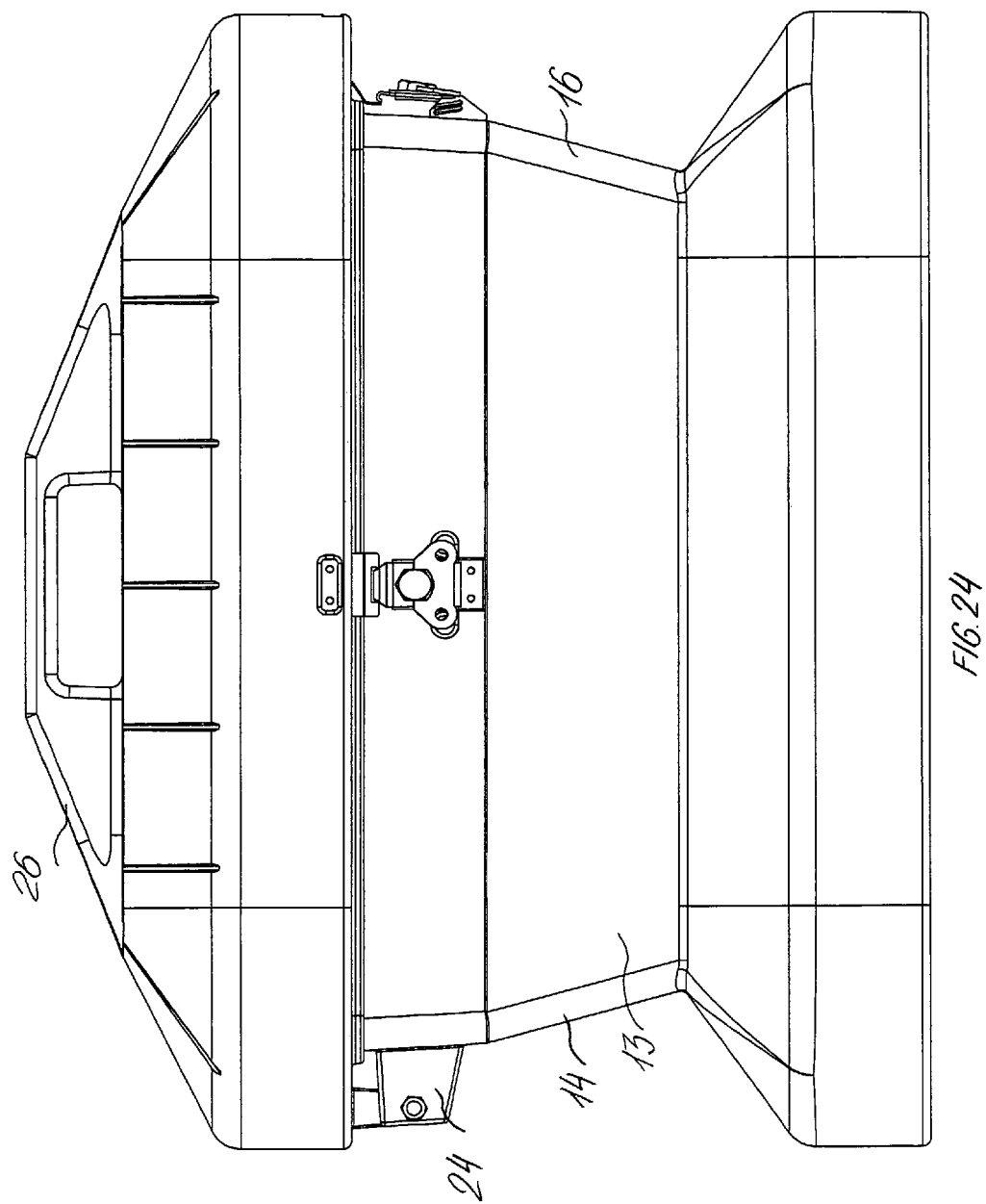
FIG. 24 is an alternative side view of the enclosure for electrical power distributor of FIG. 21.
Figure 25:
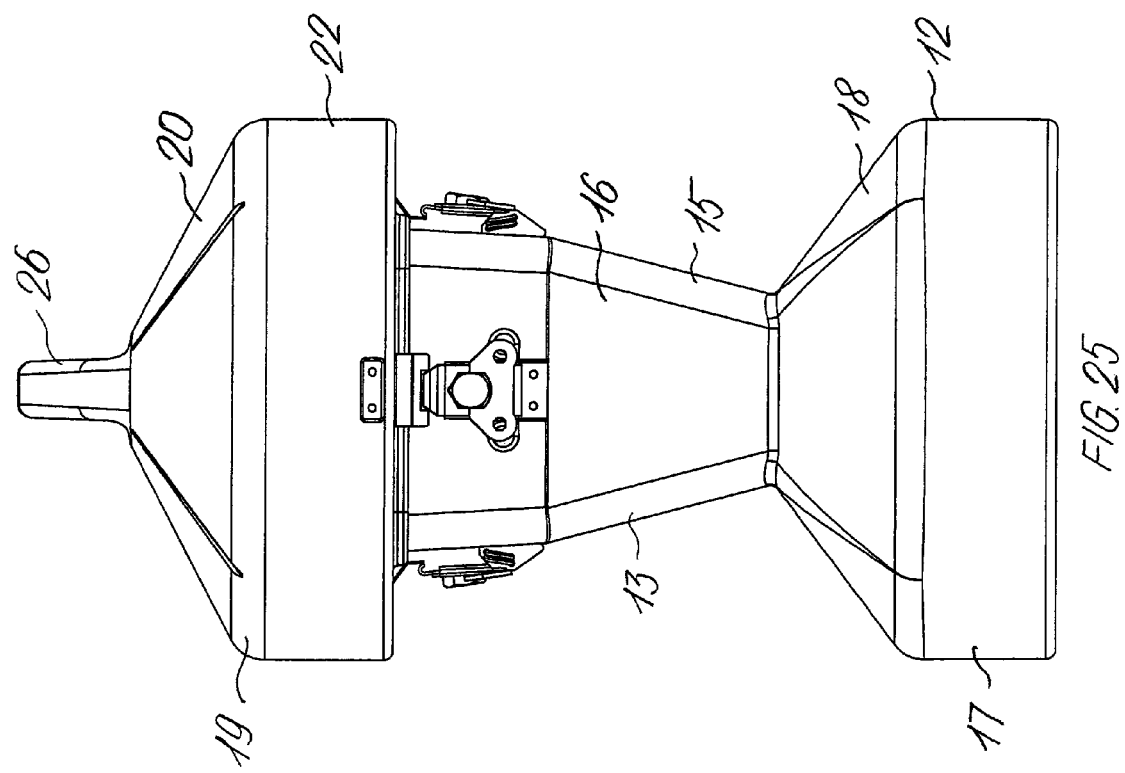
FIG. 25 is an alternative side view of the enclosure for electrical power distributor of FIG. 21.
Figure 26:
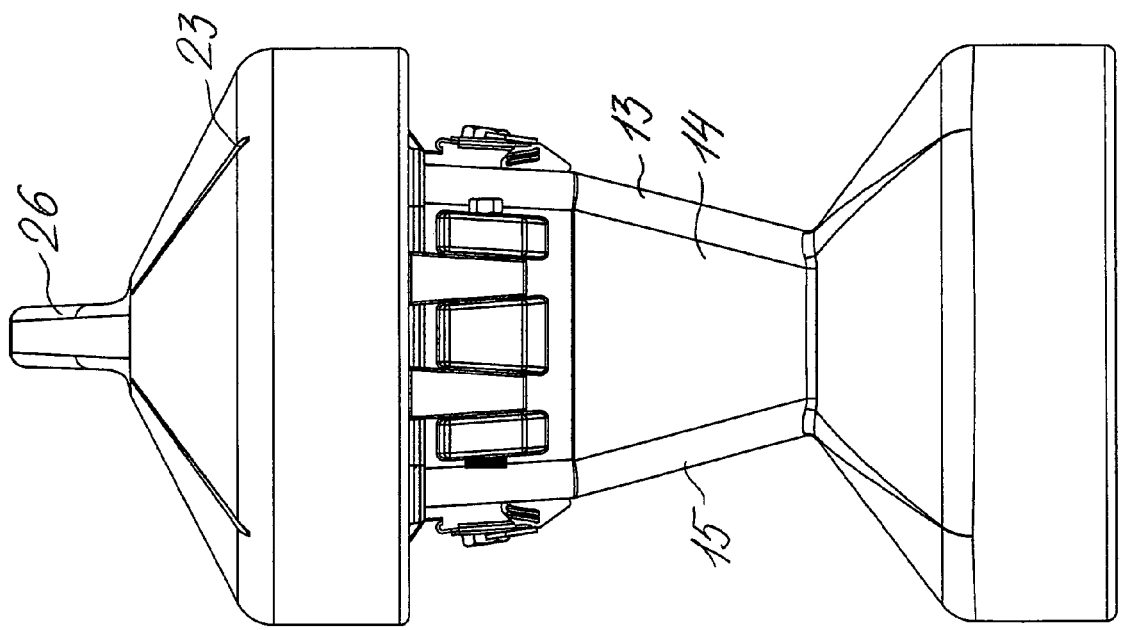
FIG. 26 is an alternative side view of the enclosure for electrical power distributor of FIG. 21.
Figure 27:
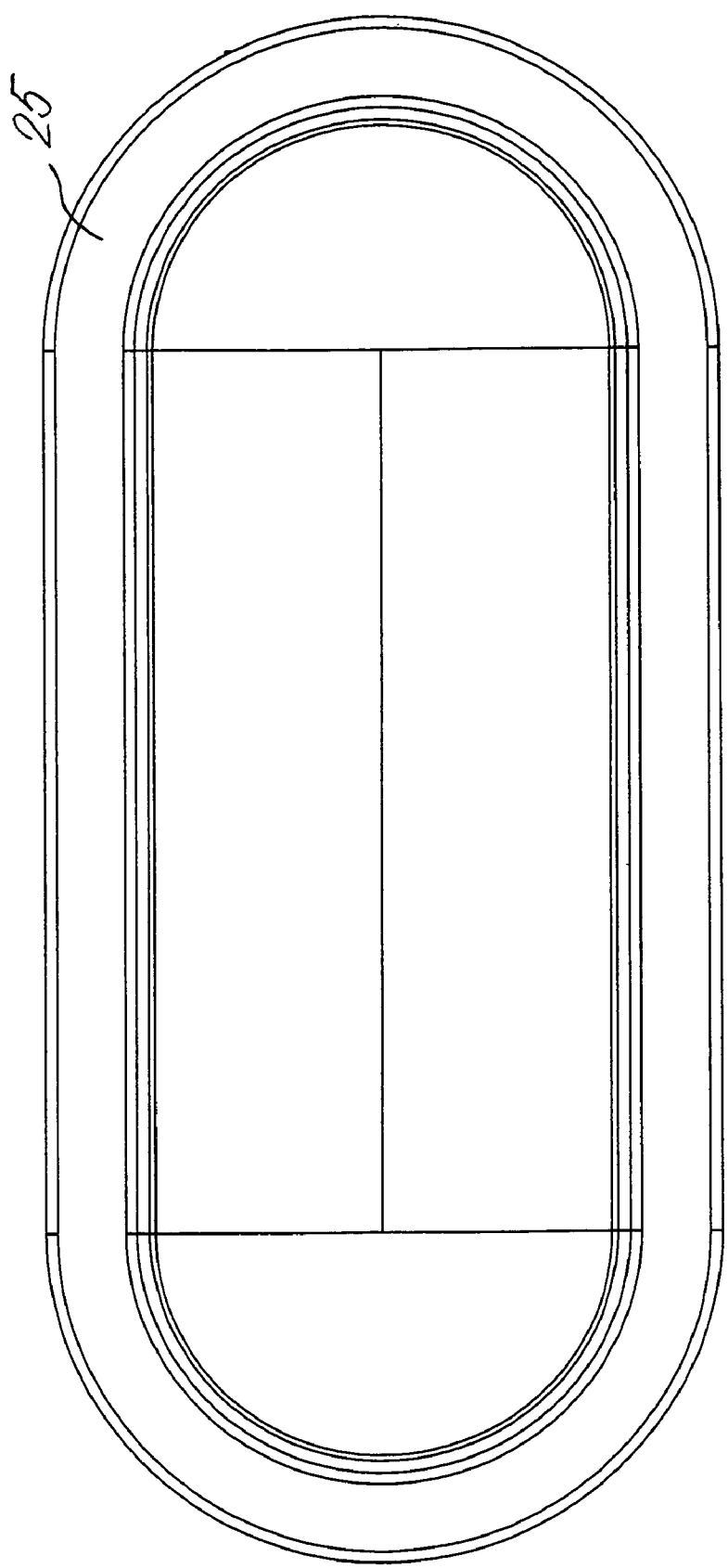
FIG. 27 is a bottom view of the enclosure for electrical power distributor of FIG. 21.
Figure 30:
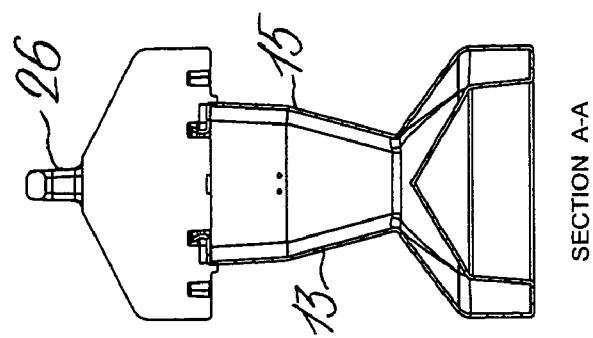
FIG. 30 is a cross-away view of the enclosure for electrical power distributor of FIG. 28 taken along line A-A shown in FIG. 29.
Figure 29:
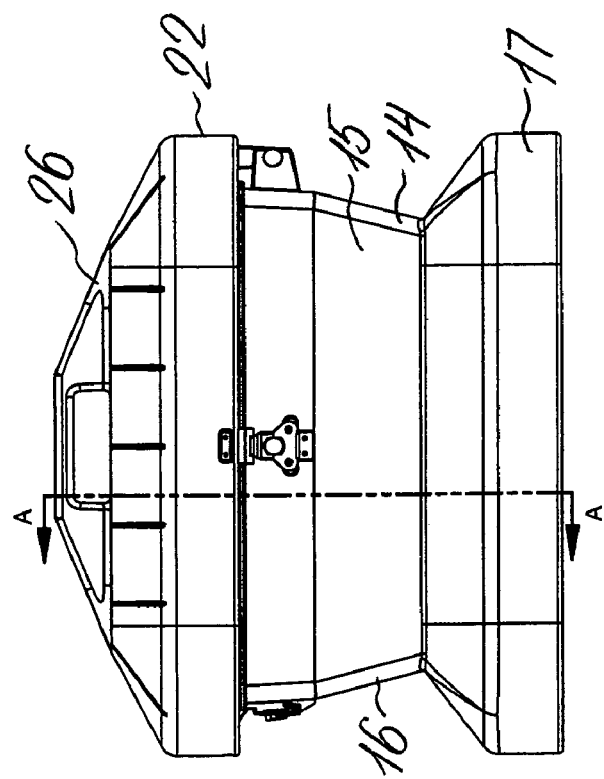
FIG. 29 is an alternative side view of the enclosure for electrical power distributor of FIG. 28.
Figure 28:
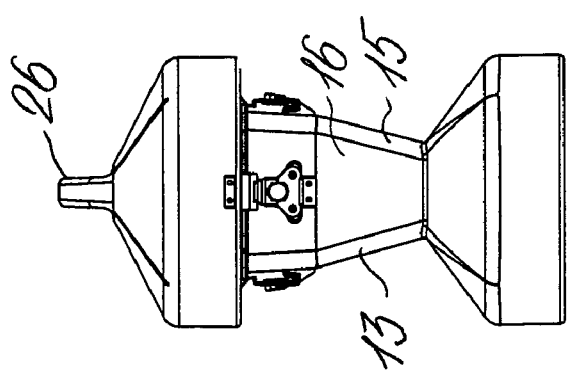
FIG. 28 is an alternative side view of the enclosure for electrical power distributor of FIG. 21.
Figure 32:
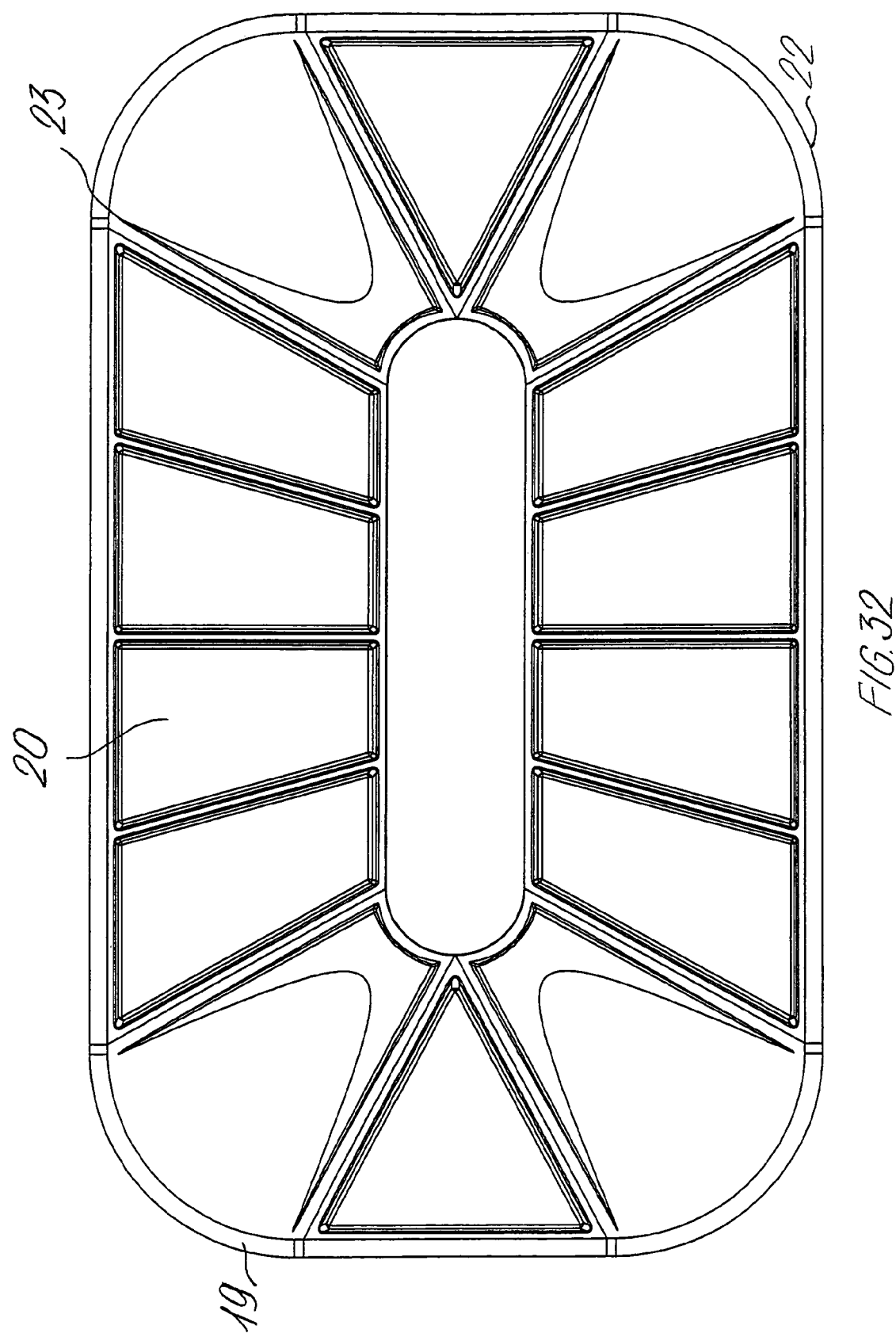
FIG. 32 is a top view of the enclosure for electrical power distributor of FIG. 31.

The current invention is directed to an enclosure that is useful in a variety of applications. One such application is used as a power distribution device, portable power generator or other suitable electrical system. The present invention also has applicability for audio and video equipment and other devices that are used in areas subject to weather, water, dust, dirt, etc.

FIG. 1 shows a perspective view of a representative enclosure 10 of the present invention. The enclosure has a top member or cover 11 and a base section 12. The base section 12 preferably has a generally flat bottom 25 so that the device can rest on a surface in a relatively stable manner without easily tipping. Extending upwardly from the base is at least one side wall 13. As shown in FIG. 1, there are generally four side walls, 13, 14, 15 and 16, forming a cavity 37 (See FIG. 9) for receiving a device or plurality of devices.

In this embodiment of FIG. 1, there are four side walls 13, 14, 15 and 16 that form a generally square cross section. However, the side walls can be circular in cross section or any other suitable cross section. The base section 12 has a perimeter side edge or base side wall portion 17 in the preferred embodiment that extends upwardly from the flat bottom 25. In this example, the side edge 17 forms a generally circular portion to permit the enclosure to roll when transported. Extending inwardly from side edge 17 is ledge 18. The ledge or skirt 18 is preferably angled to drain water away from the enclosure. However, it can be flat or other shape as well. The skirt 18 connects at one end to the side edge 17 and to the side walls 13, 14, 15 and 16 at the opposite edge. The side walls 13, 14, 15 and 16 are shown with a generally straight side. How-ever, they could be curved or combinations of curves and straight walls. In fact, the wall can have a concave face extending from the edge of the side wall portion upwardly to the top edge of the side wall. Side walls 13, 14, 15 and 16 can terminate at an opening, see FIG. 9. These side walls form an opening in the enclosure for receiving a device or other object. Once the devices or other objects are positioned in the enclosure, the opening may be sealed. Extending across the opening is preferably a sheet of a flexible material 29 that is secured to the top edge of the side walls by a heat seal, an adhesive, a locking ring or other suitable means to create a seal that prevents the ingress of water, dirt, dust or other contaminant. One preferred material is a silicone film. The film is preferably not overly taut over the open surface. This will permit a user to manipulate switches such as toggle switches and the like without removing the plastic seal.

The opening is also covered by a lid 19 which is preferably made from the same material as the remainder of the enclosure. The cover or lid has a top surface 20, a bottom surface 21 and a side edge 22. As in the case of the base, the side edge is preferably generally round to permit easy rolling of the device if the terrain or application requires it. The top surface is slightly peaked and may have one or more channels 23 thereon to assist in the flow of water off the enclosure.

In one embodiment, the invention may be an enclosure for electrical power distributor. Often, there is a necessity to have a source of electric power that may work reliably during severe weather conditions and/or wide variety of terrain. Many conventional power distributors may not adequately protect the interior of the distributor from harsh atmospheric conditions thus creating possibly hazardous condition of fire and/or electric shock. Moreover, very often circumstances demands portability of such devices but the bulkiness and weight create a substantial obstacle to this task. It would be advantageous to combine relatively easy portability and weatherproof in one single apparatus. The current invention provides such opportunity. In order to have convenient movability the invention may have rounded shape, preferably as a cylinder. The cylinder when positioned on its side may be simply rolled along the ground to the destination thus eliminating the necessity to have attached wheels or to carry it by handles. Thus the current embodiment may help to avoid difficulties when wheels are stuck in a rough or muddy terrain or break away from the power distributor. If the invention is embodied as a cylinder, at least one of the opposite surfaces of such cylinder may be relatively flat in order to secure relatively stable positioning of the distributor when it is positioned upright on such surface making operating convenient.

The power distributor may be made from any suitable material that may make available weather and corrosion resistance and which may be strong, light weight and fire resistant, preferably from polyethylene plastic.

One embodiment preferably has at least one portion thereof where electric power connection modules are positioned. See FIGS. 1 to 6. Such portion may be any portion of the invention, preferably between opposite top and bottom surfaces on the side walls the cylinder. The preferred embodiment may thus have one or more side walls 13 shown in FIG. 1 where electric plugs 31 are positioned. This side wall portion 13 may have a smaller diameter then the rest of the power distributor, as depicted in FIG. 1. In such embodiment, the middle portion may avoid contact with a ground when the power distributor is rolled thus protecting electric modules from dust and dirt. Therefore, one embodiment may have at least two cylindrical portions having a diameter or perimeter which is rather larger than the cross section of the middle portion where the side walls are located as shown in FIG. 1.

Diameters of top and bottom portions 11 and 12 are preferably generally equal because it may make available the distributor to maintain relatively straight direction when it is rolled.

The side wall portion of the invention may have any shape suitable for convenient operation of the device. In one embodiment the middle portion may have an oblong shape forming several surfaces in angled relations to each other. Such surfaces may separate outlets with similar voltage or by any other similarity for easier operation of the device as depicted in FIG. 3 through FIG. 6. Depending on the amount outlet modules, such modules may be aligned along one or more levels encircling the middle portion. Compare FIGS. 4 and 5 with FIGS. 1 and 6. In one embodiment the electric power distributor may have plugs arranged around the distributor in two levels, as shown in FIG. 3 through FIG. 6. Plugs are preferably evenly distributed within the middle portion of the device. Also, plugs may be provided with protecting cover which may keep dust, water and dirt away when such plugs are not in use. If the device has multiple plugs and it would be better to arranged them within two or more rows around the middle portion power distributor, the former may form several side surfaces angled to each other as shown in FIG. 3 through FIG. 6. Angled positioning may provide easier access to modules while plugging and unplugging of power cords.

As shown if FIG. 9, the interior of the power distributor may be hollow. It is preferred that the device allow access to the interior which may be necessary while cleaning inside, repairing etc. To provide access to the interior the invention may be equipped with a cover or lid, preferably removable. The size of such lid may vary; in one embodiment the lid may be the entire side top portion of the device as shown in FIG. 9. The attachment of such lid may have various embodiments that may make available relatively easy opening and closing. In one embodiment the lid may be connected with the power distributor with hinges 24 as shown in FIG. 10 although any other suitable means of attachment are possible. It is preferable that the lid when closed be held tightly closed, by a latching means 28, with the power distributor in order to meet water and dustproof NEMA requirements for 4x outdoors power distributors. In one embodiment the outer edge of the power distributor and the corresponding edge of the lid may have the configuration shown in FIG. 11. As seen in FIGS. 8 to 11, the base side wall portion 17 extends upwardly generally at a right angle to the base. On the edge of the base side wall portion 17 opposite the base there is a skirt 18. This skirt is angled to permit water that contacts the recessed portion 27 of the enclosure to flow off of the enclosure. Extending from the end 30 of the skirt 18 opposite the base side wall portion 17 (See FIGS. 9 and 10) is a first side wall portion 32 from which extends a second side wall portion 33. The second side wall portion 33 may end in an edge 34 on which the top or cover 11 rests or there can be a sealing arrangement as shown in FIG. 11 where the top edge 34 of the second side wall portion has an inwardly extending flange 35 and a lip 36 extending upwardly. This mates with the inner surface of the top or cover forming further protection from the environment. The flange 35, on which the cover rests, and lip 36 form an opening into the cavity 37.

In the foregoing embodiment when the lid is closed the friction between edges of the power distributor and the lid may create tightness necessary to protect the interior of the power distributor from outside water or dust. The lid and the power distributor may have a snap closure or any suitable device or latch may secure the lid in that position relative to the power distributor.

Figure 33:
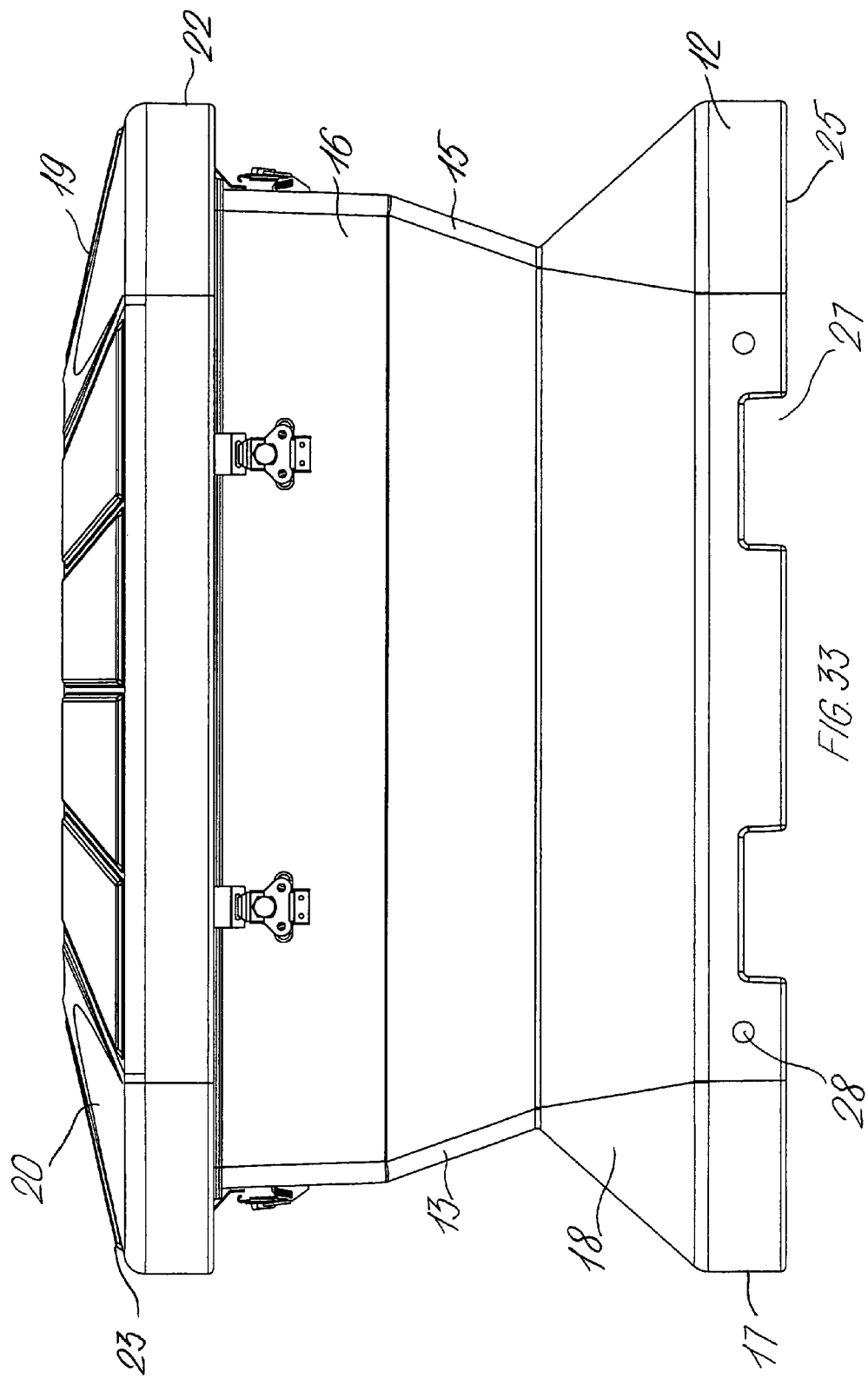
FIG. 33 is a side view of the enclosure for electrical power distributor of FIG. 31.
Figure 34:
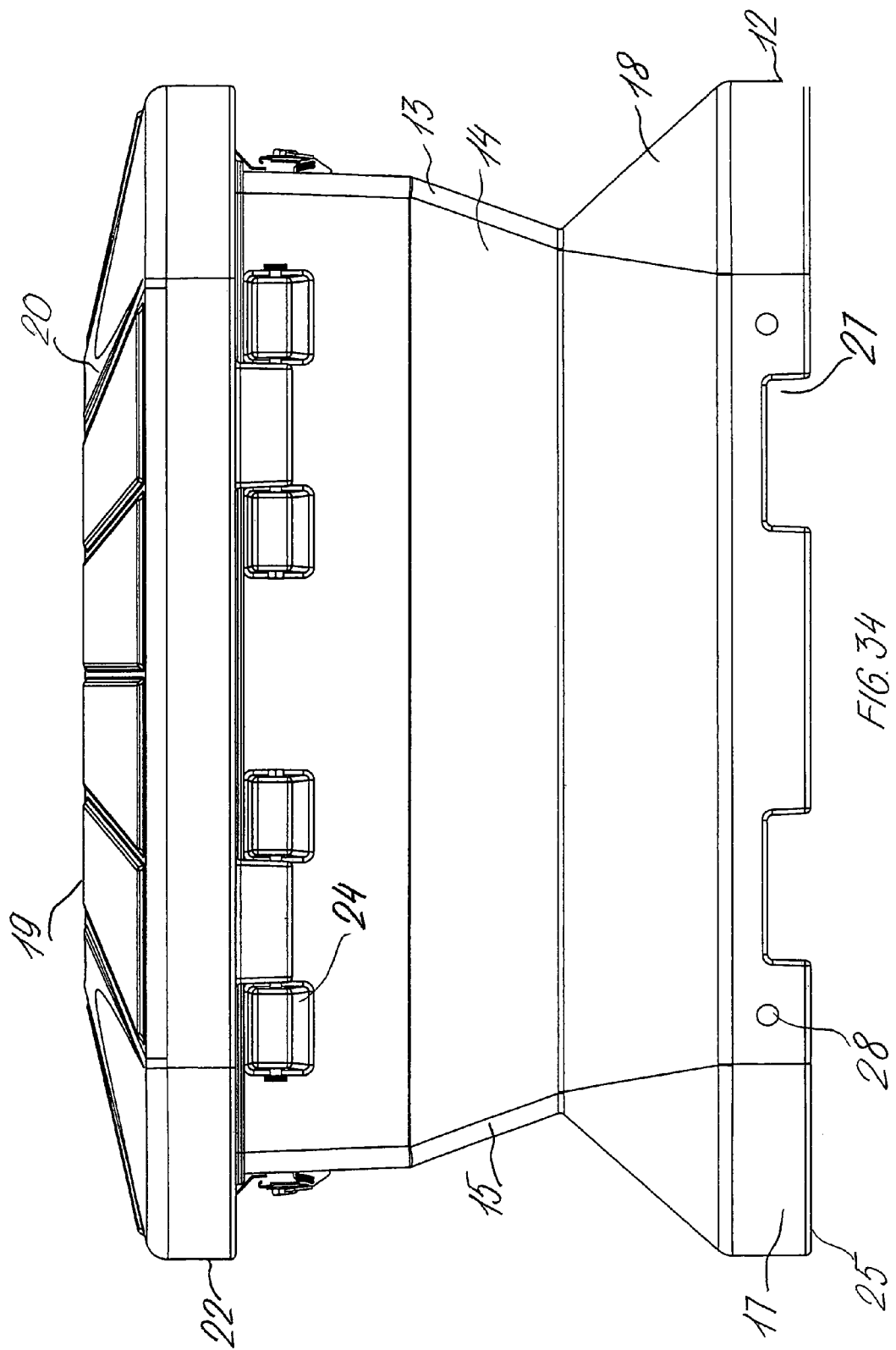
FIG. 34 is an alternative side view of the enclosure for electrical power distributor of FIG. 31.
Figure 35:
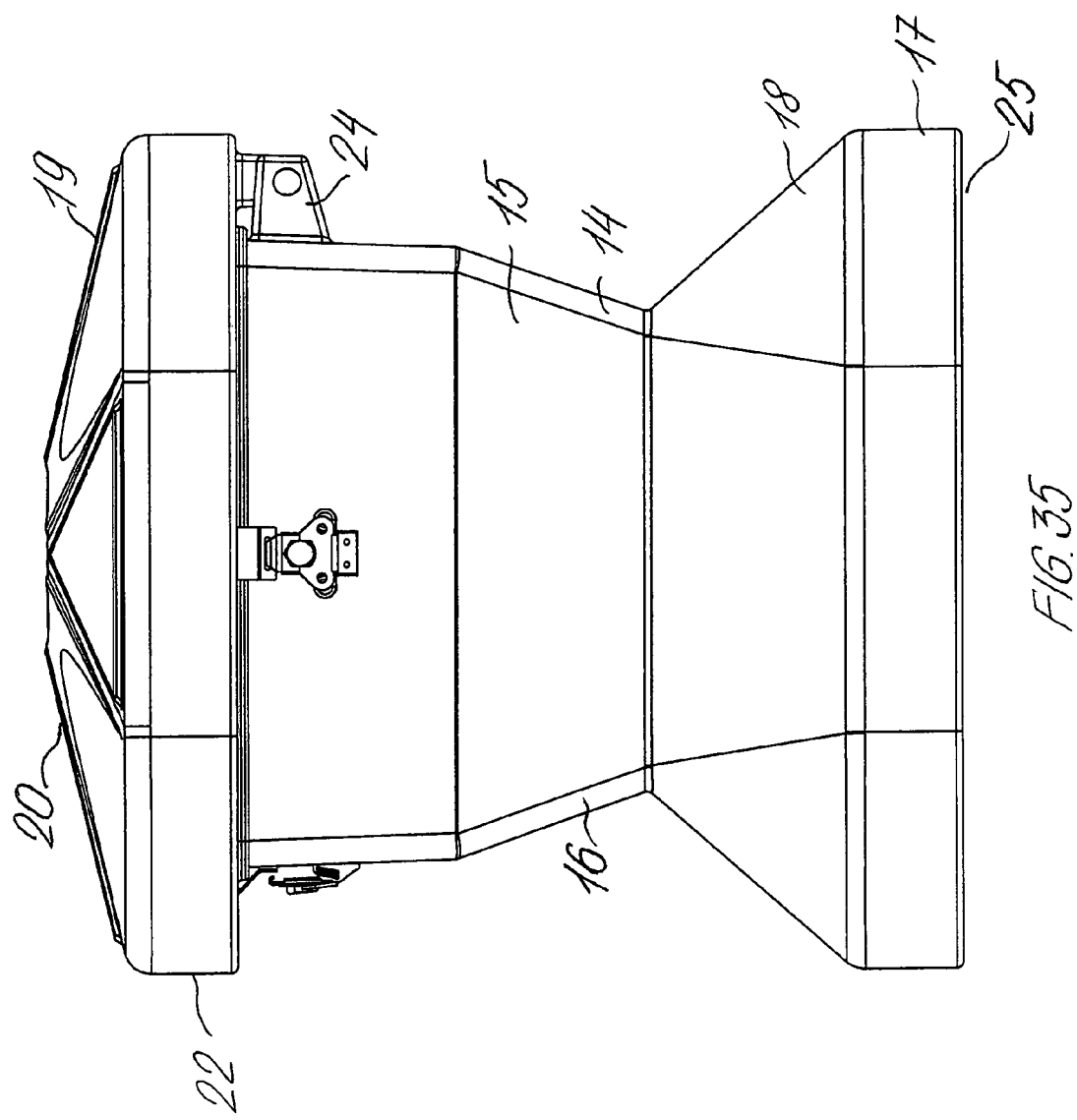
FIG. 35 is an alternative side view of the enclosure for electrical power distributor of FIG. 31.
Figure 36:
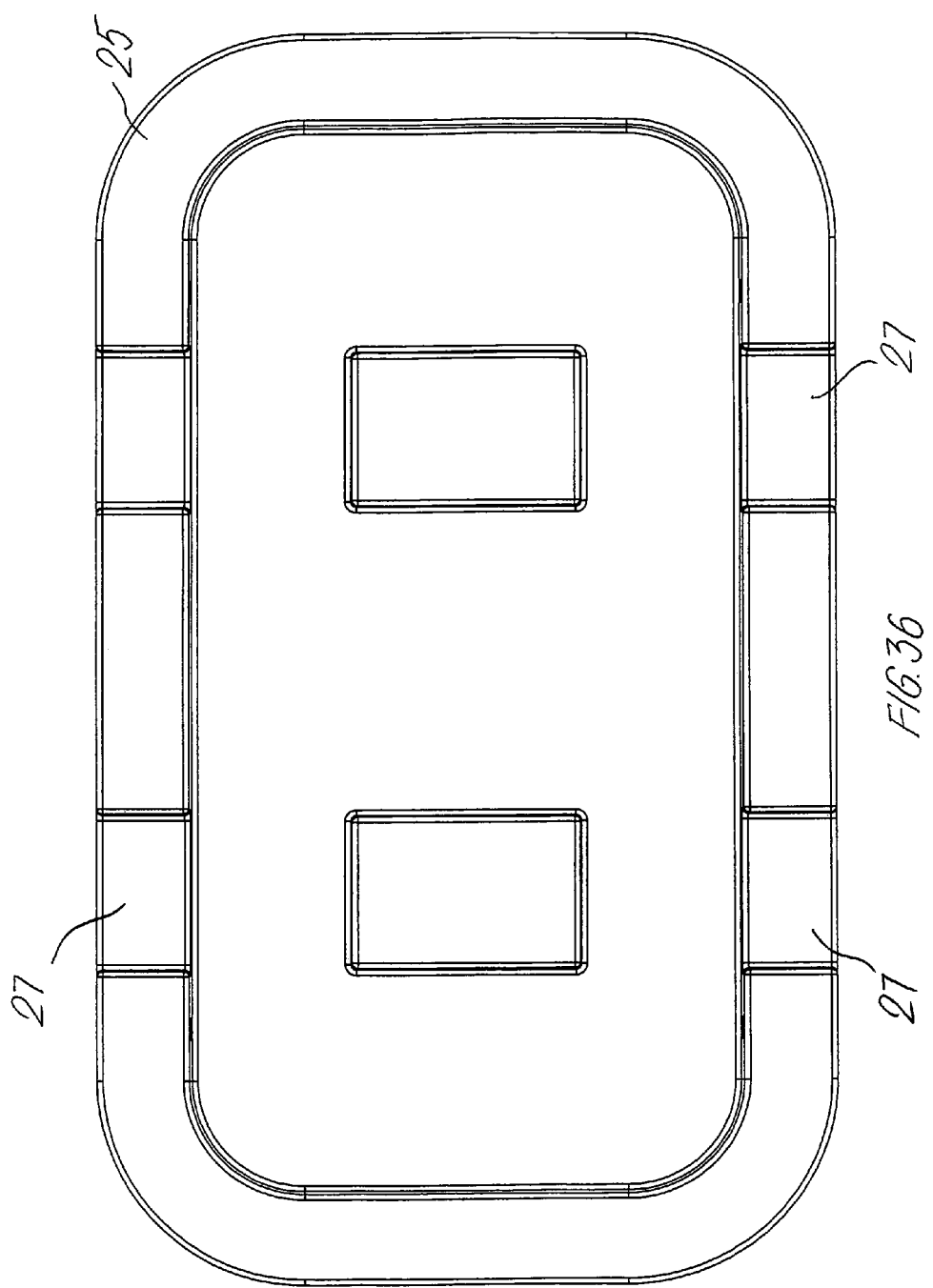
FIG. 36 is a bottom view of the enclosure for electrical power distributor of FIG. 31.

Although only one embodiment of this invention has been described in detail above, those skilled in the art will readily appreciate that many modifications of the exemplary embodiment are possible without materially departing from the novel teachings and advantages of this invention. Alternative mechanisms may provide for the coupling of various parts of a distributor, different types of the engagement between a distributor and a lid or any other portions of this apparatus. For example, the lid 19 may be equipped with handle 26, as shown in FIG. 21-26. Or bottom portion 12 may be provided with recesses 27 to accommodate forklift, as depicted in FIG. 33, FIG. 34 and FIG. 36. Furthermore, alternative shapes and configuration may be used. All such variations and modifications intended to be included within the scope if this invention. Exemplary alternative embodiments of the distributor are depicted in FIG. 31 through FIG. 38.

Other modifications, substitutions, omissions and changes may be made in the design, size, materials used or proportions, operating conditions, arrangement or positioning of elements and members of the preferred embodiment without departing from the spirit of this invention as described herein.

We claim:

1. An enclosure for electrical components and the like comprising a base having an interior surface and an exterior surface; said base having a perimeter side edge and a skirt extending therefrom, said skirt having one or more bottom side wall portions extending from an edge opposite said perimeter side edge; said side wall portions and said skirt forming a recessed portion extending from an edge of said base; said recessed portion having a cross section less than a cross section of said perimeter side edge; said sidewall portions forming a cavity for receiving electrical components to be positioned therein; said enclosure further comprising a removable lid where said lid attaches to said base of said enclosure; said lid having a top surface and a bottom surface and a top side wall portion extending from said top surface; said enclosure being capable of being rolled on said top side wall portion of said lid and said perimeter side edge of said base when said removable lid is attached to said base.

2. The enclosure according to claim 1 wherein said base and top are generally circular.

3. The enclosure according to claim 2 wherein said top side wall portion of said lid and said perimeter side edge of said base have generally the same diameter.

4. The enclosure according to claim 1 wherein said top sidewall portion of said lid and said perimeter side edge of said base have generally the same cross section.

5. The enclosure according to claim 4 wherein said recessed portion has one or more connecting means extending therefrom, said connecting means extending from said recessed portion a distance that does not interfere with rolling said enclosure on said top side wall portion and said perimeter side edge.

6. The enclosure according to claim 5 wherein said connecting means is for connecting electrical components contained in said enclosure.

7. The enclosure according to claim 6 wherein said recessed portion comprises a plurality of side walls.

8. The enclosure according to claim 5 wherein said connecting means comprises a first end connected to said recessed portion and a second end opposite said first end; said connecting means being open to an interior portion of said enclosure.

9. The enclosure according to claim 8 wherein said connecting means has a removable cover over said second end.

10. The enclosure according to claim 1 wherein said skirt is generally conical.

11. The enclosure according to claim 10 wherein said side wall of said base and the side wall of said top have four linear portions; each linear portion separated by a curved portion.

12. The enclosure according to claim 11 wherein an outer surface of the linear portions of said top side wall and linear portions of said base side wall are generally in the same plane.

13. The enclosure according to claim 11 wherein each outer surface of the linear portions of said top side wall is generally parallel to its respective outer surface of the linear portions of said base side wall.

14. The enclosure according to claim 1 wherein there is a flexible film secured to the top edge of said recess portion.

15. The enclosure according to claim 14 wherein said flexible film permits switches contained in said enclosure to be activated and deactivated without removing the flexible film.

16. The enclosure according to claim 1 wherein said lid is attached to said base of said enclosure with hinges.

17. The enclosure according to claim 16 wherein said lid is secured to said base of said enclosure with a latching means.

\* \* \* \* \*